United States Patent
Petit

(10) Patent No.: US 11,428,818 B2
(45) Date of Patent: Aug. 30, 2022

(54) LASER SCANNER FOR MEASURING DISTANCES FROM VEHICLES

(71) Applicant: Blickfeld GmbH, Munich (DE)

(72) Inventor: Florian Petit, Munich (DE)

(73) Assignee: Blickfeld GmbH, Munich (DE)

( * ) Notice: Subject to any disclaimer, the term of this patent is extended or adjusted under 35 U.S.C. 154(b) by 819 days.

(21) Appl. No.: 16/329,897

(22) PCT Filed: Sep. 11, 2017

(86) PCT No.: PCT/EP2017/072695
§ 371 (c)(1),
(2) Date: Mar. 1, 2019

(87) PCT Pub. No.: WO2018/046714
PCT Pub. Date: Mar. 15, 2018

(65) Prior Publication Data
US 2019/0212454 A1    Jul. 11, 2019

(30) Foreign Application Priority Data
Sep. 10, 2016 (DE) .................. 10 2016 010 985.8

(51) Int. Cl.
| G01S 17/93 | (2020.01) |
| G01S 7/481 | (2006.01) |
| G01S 17/08 | (2006.01) |
| G01S 17/931 | (2020.01) |
| G01S 7/00 | (2006.01) |
| G01S 7/48 | (2006.01) |
| G01S 17/42 | (2006.01) |
| G05D 1/02 | (2020.01) |

(52) U.S. Cl.
CPC ............ *G01S 17/931* (2020.01); *G01S 7/003* (2013.01); *G01S 7/48* (2013.01); *G01S 7/4817* (2013.01); *G01S 7/4818* (2013.01); *G01S 17/08* (2013.01); *G01S 17/42* (2013.01); *G05D 1/0231* (2013.01); *G05D 2201/0213* (2013.01)

(58) Field of Classification Search
CPC .......... G01S 17/931; G01S 7/003; G01S 7/48; G01S 17/42; G01S 7/4817; G01S 7/4818; G01S 17/08; G05D 1/0231; G05D 2201/0213
USPC ....................................... 356/4.01
See application file for complete search history.

(56) References Cited

U.S. PATENT DOCUMENTS

| 5,283,622 A | 2/1994 | Ueno et al. |
| 6,246,502 B1 | 6/2001 | Okada et al. |
| 6,856,919 B1 | 2/2005 | Bastian et al. |
| 9,383,753 B1 | 7/2016 | Templeton et al. |

(Continued)

FOREIGN PATENT DOCUMENTS

| DE | 102014223900 A1 * | 5/2016 | ........... G01S 17/023 |
| WO | WO-2016138585 A1 * | 9/2016 | ........... G01S 17/023 |

OTHER PUBLICATIONS

Hassenpflug English translation of description of DE102014223900A1, 40 pages. (Year: 2022).*

(Continued)

*Primary Examiner* — Daniel L Murphy
(74) *Attorney, Agent, or Firm* — Eschweiler & Potashnik, LLC

(57) ABSTRACT

An operating mode of a laser scanner is selected from a plurality of operating modes in dependence on a driving state of a vehicle.

17 Claims, 12 Drawing Sheets

(56) References Cited

U.S. PATENT DOCUMENTS

| 9,423,498 B1 | 8/2016 | Brown |
| 2016/0047895 A1 | 2/2016 | Dussan |
| 2016/0146941 A1 | 5/2016 | Hassenpflug et al. |
| 2016/0259058 A1 | 9/2016 | Verheggen et al. |

OTHER PUBLICATIONS

International Preliminary Report on Patentability dated Mar. 21, 2019 in connection with International Application No. PCT/EP2017/072695.

International Search Report dated Dec. 8, 2017 in connection with International Application No. PCT/EP2017/072695.

* cited by examiner road type: freeway
speed: 140 km/h
yaw rate: 0.02 rad/s

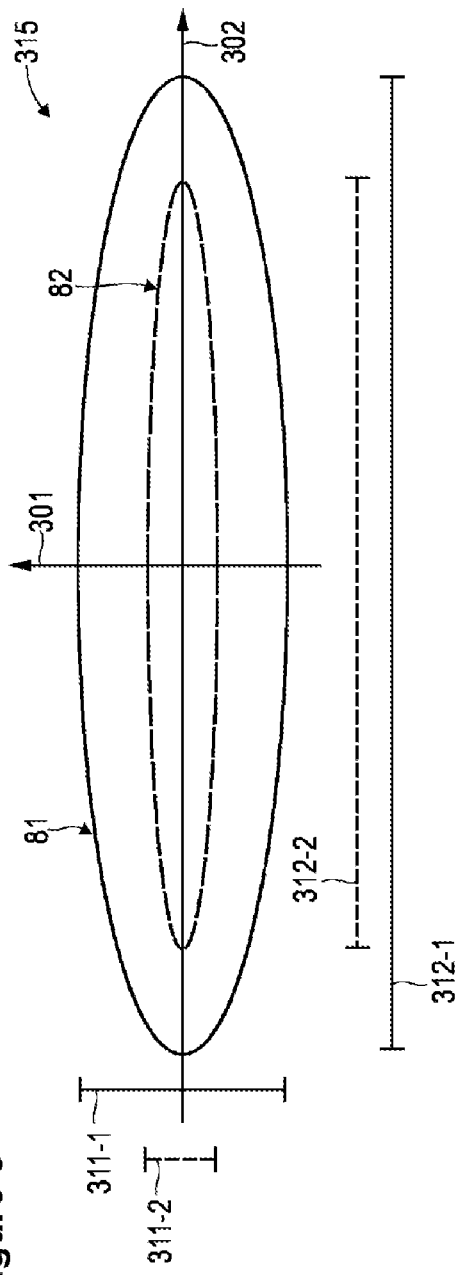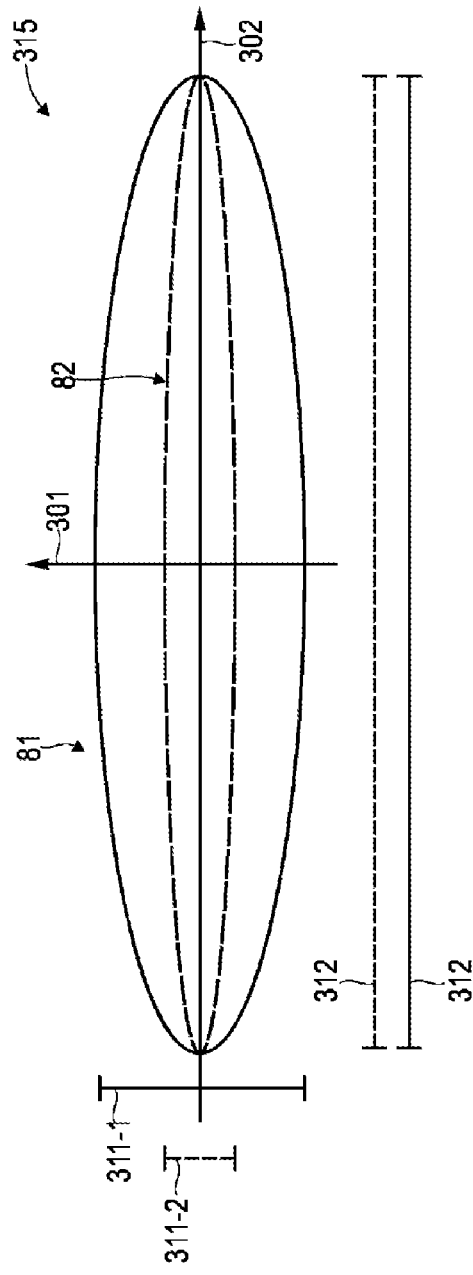
Figure 8
Figure 9

LASER SCANNER FOR MEASURING DISTANCES FROM VEHICLES

REFERENCE TO RELATED APPLICATIONS

This application is a National Phase entry application of International Patent Application No. PCT/EP2017/072695 filed Sep. 11, 2017, which claims priority to German Application 10 2016 010 985.8 filed Sep. 10, 2016, the contents of which are hereby incorporated by reference in their entirety.

TECHNICAL AREA

Various embodiments relate to a laser scanner. In particular, various embodiments relate to the operation of the laser scanner in dependence on a driving state of a vehicle, for example, a passenger automobile.

BACKGROUND

Measuring distances to objects is desirable in various technological fields. For example, it can be desirable in conjunction with applications of autonomous driving to detect objects in the surroundings of vehicles and in particular to determine a distance to the objects.

One technology for measuring distances from objects is the so-called LIDAR technology (light detection and ranging; sometimes also LADAR). In this case, pulsed laser light is emitted by an emitter. The objects in the surroundings reflect the laser light. These reflections can subsequently be measured. A distance to the objects can be determined by determining the runtime of the laser light.

To detect the objects in the surroundings in a position-resolved manner, it can be possible to scan the laser light. Depending on the emission angle of the laser light, different objects in the surroundings can thus be detected.

In some applications, LIDAR technologies are used in vehicles, for example, passenger automobiles. Thus, for example, technologies of autonomous driving can be implemented. In general, various driver assistance functionalities based on LIDAR data using distance and/or depth information are conceivable.

However, conventional laser scanners have certain restrictions and disadvantages. For example, it is often possible that the operating mode of the laser scanner is fixedly predetermined, for example, because of the hardware geometry of the laser scanner. Depending on the driving state of the vehicle, inaccuracies can then occur when measuring distances from objects in the surroundings.

SUMMARY

There is therefore a demand for improved technologies for measuring distances from objects based on laser light. In particular, there is a demand for those technologies which mitigate or remedy at least some of the above-mentioned restrictions and disadvantages.

This object is achieved by the features of the independent patent claims. The dependent patent claims define embodiments.

In one example, a device comprises a laser scanner. The laser scanner has a laser light source. The laser scanner is configured to scan laser light from the laser light source along a first scanning axis. The device also comprises an interface, which is configured to receive control data. The control data are indicative of a driving state of the vehicle. The device also comprises at least one computer unit. The at least one computer unit is configured to operate the laser scanner to select an active operating mode from a plurality of operating modes in dependence on the driving state of the vehicle. The at least one computer unit is furthermore configured to carry out a measurement of distances to objects in the surroundings of the device based on the laser light.

In one example, a method comprises the scanning of laser light by means of a laser scanner along a first scanning axis. The method also comprises the reception of control data. The control data are indicative of a driving state of a vehicle. The method also comprises the operation of the laser scanner, in order to select an active operating mode from a plurality of operating modes in dependence on the driving state of the vehicle. The method furthermore comprises carrying out a measurement of distances to objects in the surroundings based on the laser light.

The distance measurement can be carried out using the active operating mode. The plurality of operating modes can vary the operation of the laser scanner.

In one example, a vehicle comprises a device having a laser scanner. The laser scanner has a laser light source. The laser scanner is configured to scan laser light from the laser light source along a first scanning axis. The device also comprises an interface, which is configured to receive control data. The control data are indicative of a driving state of the vehicle. The device also comprises at least one computer unit. The at least one computer unit is configured to operate the laser scanner to select an active operating mode from a plurality of operating modes in dependence on the driving state of the vehicle. The at least one computer unit is furthermore configured to carry out a measurement of distances to objects in the surroundings of the device based on the laser light.

A device comprises a LIDAR system having a laser light source, wherein the LIDAR system is configured to monitor reflections of laser light from the laser light source along a first axis in a position-resolved manner. The device also comprises an interface, which is configured to receive control data which are indicative of a driving state of a vehicle. The device furthermore comprises at least one computer unit, which is configured to operate the LIDAR system to select an active operating mode from a plurality of operating modes in dependence on the driving state of the vehicle. In this case, the at least one computer unit is furthermore configured to carry out a measurement of distances to objects in the surroundings of the device based on the laser light. For example, the device could comprise a flash-LIDAR system.

The above-mentioned features and features which are described hereafter can be used not only in the corresponding explicitly mentioned combinations, but rather also in further combinations or in isolation, without leaving the scope of protection of the present invention.

BRIEF DESCRIPTION OF THE FIGURES

FIG. 6 is a schematic side view of a vehicle having a device having a laser scanner according to various embodiments, wherein FIG. 6 illustrates a vertical scanning axis.

FIG. 7 is a schematic view of a vehicle having a device having a laser scanner according to various embodiments, wherein FIG. 7 illustrates a horizontal scanning axis.

FIG. 8 illustrates a scanning region defined by the vertical scanning axis and the horizontal scanning axis according to various embodiments, the dimensions of which vary in dependence on an operating state of the laser scanner.

FIG. 9 illustrates a scanning region defined by the vertical scanning axis and the horizontal scanning axis according to various embodiments, the dimensions of which vary in dependence on an operating state of the laser scanner.

DETAILED DESCRIPTION OF EMBODIMENTS

Figure 1:
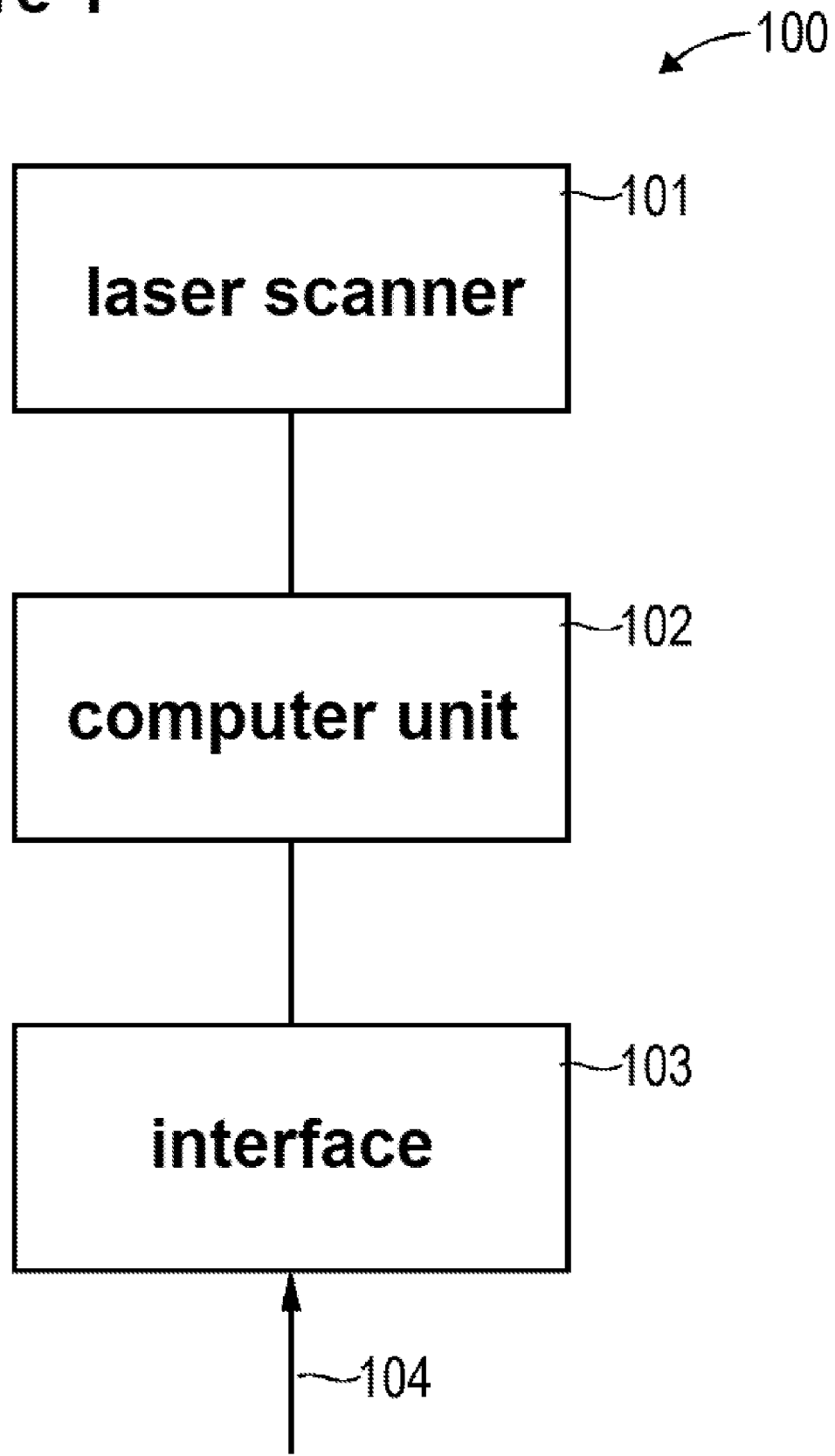
FIG. 1 schematically illustrates a device according to various embodiments having a laser scanner and an interface, which is configured to receive control data which are indicative of a driving state of a vehicle.

The above-described properties, features, and advantages of this invention and the manner in which they are achieved will become more clearly and unambiguously comprehensible in conjunction with the following description of the exemplary embodiments, which are explained in greater detail in conjunction with the drawings.

The present invention will be explained in greater detail hereafter on the basis of preferred embodiments with reference to the drawings. In the figures, identical reference signs identify identical or similar elements. The figures are schematic representations of various embodiments of the invention. Elements illustrated in the figures are not necessarily shown to scale. Rather, the various elements illustrated in the figures are reproduced in such a way that the function and general-purpose thereof are comprehensible to a person skilled in the art. Connections and couplings between functional units and elements illustrated in the figures can also be implemented as an indirect connection or coupling. A connection or coupling can be implemented as wired or wireless. Functional units can be implemented as hardware, software, or a combination of hardware and software.

Various technologies for scanning laser light will be described hereafter. The technologies described hereafter can enable, for example, the one-dimensional or two-dimensional scanning of laser light. The scanning can refer to repeated emission of laser light at different emission angles. The repeated implementation of a specific emission angle can determine a repetition rate of the scanning. The set of the scanning angles can define a scanning region or an image region. The scanning can refer to the repeated scanning of different scanning points in the surroundings by means of laser light. Specific data can be determined for each scanning point.

The repeated scanning of the scanning region corresponds to an image repetition rate. The image repetition rate is typically in the range from 5 Hz-50 Hz. In this case, however, the same scanning frequency, which can be established, for example, by the natural frequency of an elastic suspension of a deflection unit in the case of a resonant scanner, can be used for different image repetition rates.

For example, coherent or incoherent laser light can be used. It would be possible to use polarized or unpolarized laser light. For example, it would be possible to use the laser light in pulsed form. For example, short laser pulses having pulse durations in the range of femtoseconds or picoseconds or nanoseconds can be used. For example, a pulse duration can be in the range of 0.5-3 ns. The laser light can have a wavelength in the range of 700-1800 nm.

In various examples, the scanning region is defined one-dimensionally. This can mean, for example, that the laser scanner scans the laser light by means of a deflection unit along only one single scanning axis. In other examples, the scanning region is defined two-dimensionally. This can mean, for example, that the laser scanner scans the laser light by means of the deflection unit along a first scanning axis and along a second scanning axis. The first scanning axis and the second scanning axis are different from one another in this case. For example, the first and second scanning axes could be oriented orthogonally to one another.

In some examples, a two-dimensional scanning region can be implemented by a single deflection unit having two or more degrees of freedom of the movement. This can mean that a first movement of the deflection unit according to the first scanning axis and a second movement of the deflection unit according to the second scanning axis is effectuated, for example, by an actuator, wherein the first movement and the second movement are overlaid in position and time.

In other examples, the two-dimensional scanning region can be implemented by more than one single deflection unit. It would then be possible, for example, that for two deflection units, one single degree of freedom of the movement is excited in each case. The laser light can firstly be deflected by a first deflection unit and then deflected by a second deflection unit. The two deflection units can thus be arranged in succession in the beam path. This means that the movements of the two deflection units are not overlaid in position. For example, a corresponding laser scanner can have two mirrors or prisms arranged spaced apart from one another, which can each be adjusted individually.

In various examples, it is possible that the laser scanner resonantly operates different degrees of freedom of the movement for scanning the laser light. Such a laser scanner is sometimes also referred to as a resonant laser scanner. In particular, a resonant laser scanner can be different from a laser scanner which operates at least one degree of freedom of the movement in a stepped manner. In some examples, it would be possible, for example, that a first movement—which corresponds to a first scanning axis—and a second movement—which corresponds to a second scanning axis, which is different from the first scanning axis—are each effectuated resonantly.

In various examples, a movable end of a fiber is used as a deflection unit for scanning the laser light. For example, optical fibers, which are also referred to as glass fibers, can be used. However, it is not necessary to use optical fibers. In this case, however, it is not required for the fibers to be produced from glass. The fibers can be produced, for example, from plastic, glass, or another material. For example, the fibers can be produced from quartz glass or silicon. For example, the fibers can be released from a silicon or silicon-on-insulator (SOI) wafer. For example, the fibers can have a 70 GPa modulus of elasticity or a modulus of elasticity in the range of 40 GPa-80 GPa, preferably in the range of 60-75 GPa. For example, the fibers can have a modulus of elasticity in the range of 120 GPa-200 GPa, for example, of approximately 160 GPa. For example, the fibers can enable up to 4% material elongation. In some examples, the fibers have a core, in which the injected laser light propagates and is enclosed by total reflection at the edges (optical waveguide). However, the fibers do not have to have a core. In various examples, so-called single-mode fibers or multimode fibers can be used. The various fibers described herein can have, for example, a circular cross section. It would be possible, for example, that the various fibers described herein have a diameter which is not less than 50 μm, optionally is not <150 μm, furthermore is optionally not <500 μm, furthermore is optionally not <1 mm. The diameter can also be <1 mm, however, optionally <500 μm, furthermore optionally less than 150 μm. For example, the various fibers described herein can be designed as able to be bent or curved, i.e., flexible. For this purpose, the material of the fibers described herein can have a certain elasticity.

For example, the movable end of the fiber could be moved in one or two dimensions. For example, it would be possible that the movable end of the fiber is tilted in relation to a fixed point of the fiber; this results in a curvature of the fiber. This can correspond to a first degree of freedom of the movement. Alternatively or additionally, it would be possible that the movable end of the fiber is twisted along the fiber axis (torsion). This can correspond to a second degree of freedom of the movement. In the various examples described herein, it is possible in each case to implement a torsion of the movable end of the fiber alternatively or additionally to a curvature of the movable end of the fiber. In other examples, other degrees of freedom of the movement could also be implemented. Laser light can be emitted at various angles due to the movement of the movable end of the fiber. Surroundings can thus be scanned using the laser light. Scanning regions of different sizes can be implemented depending on the amplitude of the movement of the movable end.

In various examples, at least one optical element can be attached to the movable end of the fiber, for example, a mirror, a prism, and/or a lens, for example, a lens having gradient index (GRIN lens). It is possible to deflect the laser light from the laser light source by means of the optical element. For example, the mirror could be implemented by a wafer, such as a silicon wafer, or a glass substrate. For example, the mirror could have a thickness in the range of 0.05 μm-0.1 mm, for example, in particular in the range of 500 μm+/−200 μm. For example, the mirror could have a rear structuring having ribs for stiffening while simultaneously reducing the mass moment of inertia. For example, the mirror could be formed as square, rectangular, elliptical, or circular. For example, the mirror could have a diameter in the range of 3 mm to 6 mm, but also up to 20 mm.

LIDAR technologies can be applied in various examples. The LIDAR technologies can be used for the purpose of carrying out a position-resolved measurement of distances to objects in the surroundings. For example, the LIDAR technology can comprise runtime measurements of the pulsed laser light between the movable end of the fiber, the object, and a detector. Alternatively or additionally, technologies of structured illumination could also be used.

In various examples, the LIDAR technology can be implemented in conjunction with a driver assistance functionality for a motor vehicle. A device containing the laser scanner can therefore be arranged in the motor vehicle. For example, a depth-resolved LIDAR image could be produced and transferred to a driver assistance system of the motor vehicle. Therefore, for example, technologies of assisted driving or autonomous driving can be implemented.

Various examples described herein are based on the finding that it can be desirable to select the operating mode of the laser scanner in dependence on a driving state of the vehicle. The driving state can describe, for example, an actual value of a property of the vehicle or of surroundings of the vehicle which is variable while driving. Specifically, the operating parameters of the laser scanner to be preferred can differ significantly depending on the driving state of the vehicle. For example, during rapid driving on a freeway, it can be preferable to implement a small scanning region which is oriented forward and has high resolution, to be able to reliably detect even more remote objects. In contrast, it may not be necessary during rapid driving on a freeway to achieve a particularly high resolution on the left and right from the border of the freeway. During slow driving on an inner-city street, however, it can be desirable to implement a particularly large scanning region, to also be able to detect objects positioned on the left and right of the motor vehicle. During slow driving on an inner-city street, detecting particularly remote objects—for example, more than 100 or 150 m away—can be superfluous.

Inner-city traffic can be indicated, for example, by one or more of the following: road type; speed; persons or vehicles detected in the surroundings; road curvature; etc.

Although various examples herein are described with reference to motor vehicles and in particular passenger automobiles, corresponding technologies can also be applied to other vehicles. Examples include flying drones, robots, utility vehicles, ships, trains, aircraft, boats, sailboats, etc., for example.

FIG. 1 illustrates aspects with respect to a device 100. The device 100 comprises a laser scanner 101. The laser scanner 101 is configured to emit laser light from a laser light source into surroundings of the device 100. In this case, the laser scanner 101 is configured to scan the laser light at least along a scanning axis. In some examples, the laser scanner 101 is configured to scan the laser light along a first and a second scanning axis.

The device 100 also comprises a computer unit 102. Examples of a computer unit 102 comprise an analog circuit, a digital circuit, a microprocessor, an FPGA, and/or an ASIC. The computer unit 102 can implement a logic. In some examples, the device 100 can also comprise more than one computer unit, which implement the logic in distributed form.

For example, the computer unit 102 can operate the laser scanner 101. The computer unit 102 can, for example, set one or more operating parameters of the laser scanner 101. In the various examples described herein, the computer unit 102 can activate different operating modes of the laser scanner 101. An operating mode can be defined in this case by a set of operating parameters of the laser scanner 101.

Examples of operating parameters comprise: the dimensions of the scanning region; the alignment of the scanning region, which can be defined, for example, by the arrangement of a center of the scanning region; the scanning point density, i.e., the distance between adjacent distance measurements; the repetition rate (sometimes also referred to as image repetition rate) of a scanning procedure, which defines the scanning region; the pulse energy of pulses of the laser light; the repetition rate of pulses of the laser light; a duty cycle of pulses of the laser light; a detector aperture opening; etc.

For example, in urban areas and/or at low speeds, a smaller aperture opening of the detector could be selected. The range of the distance measurement can thus be reduced, since less secondary laser light can be collected. On the other hand, however, a particularly long range of the distance measurement may not be necessary in urban areas and/or at low speeds. At the same time, due to the smaller aperture opening, interfering influences, for example, due to other laser scanners, can be reduced, since secondary laser light can be collected in a particularly location-selective manner. A variable aperture opening can be implemented, for example, by an LCD matrix or a mechanically adjustable aperture.

In this case, the computer unit 102 can be configured to determine the respective active operating mode in dependence on the driving state of the vehicle (not shown in FIG. 1), with which the device 100 interacts. For this purpose, the computer unit 102 is coupled to an interface 103. The interface 103 permits control data to be received, which are indicative of the driving state of the vehicle.

For example, the interface 103 can implement a bus interface for a controller area network (CAN) bus or a media-oriented systems transport (MOST) bus or a FlexRay bus. For example, the interface 103 can implement a plug contact.

In various examples, different driving states of the vehicle can be taken into consideration by the computer unit 102 in the selection of the active operating mode of the laser scanner 101. Examples of such driving states comprise: a road type, for example, freeway, inner-city street, country road, state highway; the speed of the vehicle, for example, in kilometers per hour; a yaw angle of the vehicle; a roll angle of the vehicle; a pitch angle of the vehicle; and/or a height profile of a road, for example, an inclination level of the road.

By taking into consideration the driving state of the vehicle in the selection of the active operating mode of the laser scanner, it is possible that the distance measurement of the objects in the surroundings can be carried out in a situation-adapted and flexible manner. A greater accuracy for the measurement of distances to the objects in the surroundings can thus be achieved. For example, the distance measurement can be adapted to the respective requirements of the driving state and LIDAR data can thus be provided which are of particular relevance for the corresponding driving assistance functionality and/or have a large information content.

The computer unit 102 is furthermore configured to carry out a distance measurement. For this purpose, the computer unit can receive raw data from the laser scanner 101. These raw data can describe, for example, a runtime of pulses of the laser light between emission and reception. These raw data can furthermore describe an associated emission angle of the laser light. Based thereon, the computer unit 102 can generate a LIDAR image which corresponds, for example, to a point cloud having depth information. It would optionally be possible that the computer unit 102 carries out, for example, object recognition based on the LIDAR image. The computer unit 102 can then output the LIDAR image. The computer unit 102 can repeatedly generate new LIDAR images, for example, at an image repetition rate corresponding to the scanning frequency. The scanning frequency can be, for example, in the range 20-100 Hz.

Figure 2:
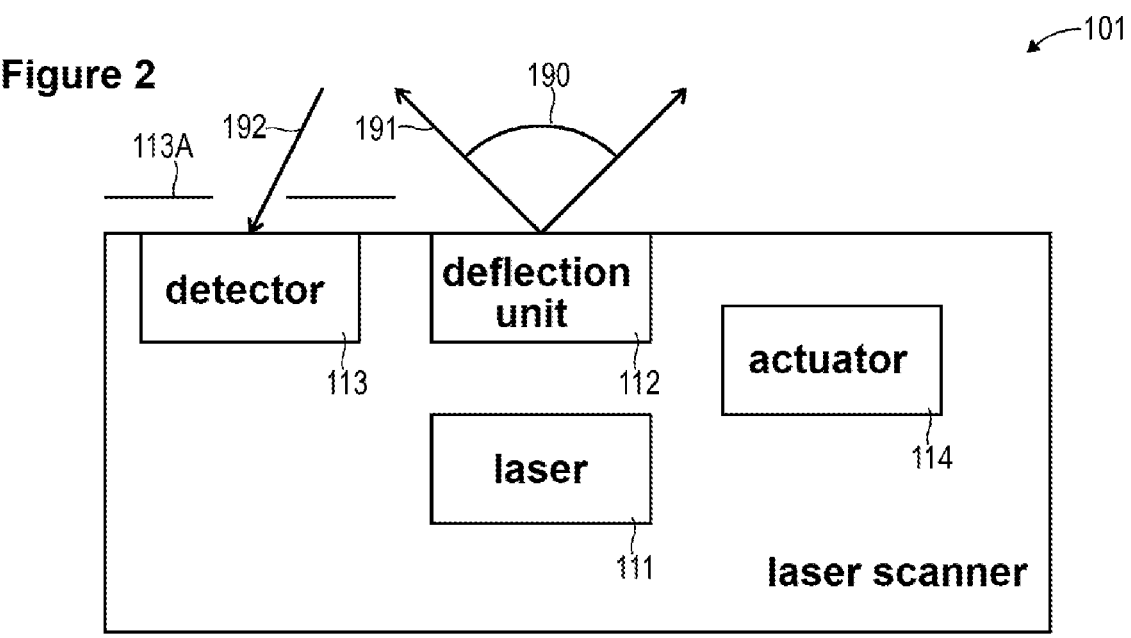
FIG. 2 schematically illustrates the laser scanner according to various embodiments.

FIG. 2 illustrates aspects with respect to the laser scanner 101. In particular, FIG. 2 illustrates a laser scanner 101 according to various examples in greater detail.

In the example of FIG. 2, the laser scanner 101 comprises a laser light source 111. For example, the laser light source 111 can be a diode laser. In some examples, the laser light source 111 can be a surface emitter (vertical-cavity surface-emitting laser; VCSEL). The laser light source 111 emits laser light 191, which is deflected by the deflection unit 112 by a specific deflection angle. In some examples, a collimator optical unit for the laser light 191 can be arranged in the beam path between the laser light source 111 and the deflection unit 112. In other examples, alternatively or additionally, the collimator optical unit for the laser light 191 could also be arranged in the beam path behind the deflection unit 112.

The deflection unit could comprise, for example, a mirror or a prism. For example, the deflection unit could comprise a rotating multifaceted prism.

The laser scanner 101 can implement one or more scanning axes (only one scanning axis is shown in FIG. 2, specifically in the plane of the drawing). A two-dimensional scanning region can be implemented by providing multiple scanning axes.

A two-dimensional scanning region can enable the measurement of distances to the objects in the surroundings to be carried out with large information content. Typically, in this manner, in addition to a horizontal scanning axis, a vertical scanning axis can be implemented—with respect to a global coordinate system, in which the motor vehicle is arranged. In particular in comparison to reference implementations, which [word missing] a vertical resolution not by scanning, but rather by an array of multiple laser light sources, which are offset in relation to one another and emit laser light at different angles onto a deflection unit, in this manner a less complex system having fewer components and/or a higher vertical resolution can be achieved. Moreover, it can be possible in various examples to adapt corresponding operating parameters of the laser scanner 101, which are associated with the vertical scanning axis, flexibly, for example, in dependence on the driving state of the vehicle. This is often not possible or is only possible in a restricted manner with a fixed installation of an array of laser light sources.

The deflection unit 112 has at least one degree of freedom of the movement for scanning the laser light 191. Each degree of freedom of the movement can define a corresponding scanning axis. The corresponding movement can be actuated or excited by an actuator 114.

To implement multiple scanning axes, it would be possible in some examples that more than one deflection unit is provided (not shown in FIG. 2). The laser light 191 can then pass through the various deflection units sequentially. Each deflection unit can have a corresponding associated degree of freedom of the movement, which corresponds to an associated scanning axis. Sometimes, such an arrangement is referred to as a scanner system.

To implement multiple scanning axes, it would be possible in further examples that the individual deflection unit 112 has more than one single degree of freedom of the movement. For example, the deflection unit 112 could have at least two degrees of freedom of the movement. Corresponding movements can be excited by the actuator 114. For example, the actuator 114 can excite the corresponding movements individually, but also in a manner parallel in time or coupled. It would then be possible to implement two or more scanning axes by effectuating the movements overlaid with respect to time and position.

By overlaying the first movement and the second movement with respect to position and time, a particularly high level of integration of the laser scanner 101 can be achieved. The laser scanner 101 can thus be implemented with small installation space. This enables flexible positioning of the laser scanner 101 in the motor vehicle. Moreover, the laser scanner 101 can have comparatively few components and can thus be produced robustly and cost-effectively.

For example, a first degree of freedom of the movement could correspond to the rotation of a mirror and a second degree of freedom could correspond to a tilt of the mirror. For example, a first degree of freedom could correspond to the rotation of a multifaceted prism and a second degree of freedom could correspond to the tilt of the multifaceted prism. For example, a first degree of freedom could correspond to the transverse mode of a fiber and a second degree of freedom of the movement could correspond to the torsion mode of the fiber. The fibers could have a corresponding movable end. For example, a first degree of freedom of the movement could correspond to a first transverse mode of a fiber and a second degree of freedom of the movement could correspond to a second transverse mode of the fiber which is, for example, orthogonal to the first transverse mode.

In some examples, it is possible that both the first movement according to a first degree of freedom of the movement, which corresponds to a first scanning axis, and also the second movement according to a second degree of freedom of the movement, which corresponds to a second scanning axis, are effectuated resonantly. In other examples, it is possible that at least one of the first movement and the second movement is not effectuated resonantly, but rather is effectuated in a discrete or stepped manner.

If both the first movement and also the second movement are effectuated resonantly, a so-called superposition figure, sometimes also a Lissajous figure, can be obtained for the scanning along the first scanning axis and the second scanning axis. If both the first movement and also the second movement are effectuated resonantly, a particularly robust and simple system can be implemented for the laser scanner. For example, the actuator can be implemented simply.

The actuator 114 is typically electrically operable. The actuator 114 could comprise magnetic components and/or piezoelectric components. For example, the actuator could comprise a rotating magnetic field source, which is configured to generate a magnetic field rotating as a function of time. The actuator could also comprise a linear magnetic field source, wherein the strength of the magnetic field is varied. A variable torque could thus be applied to a residual magnetization of a magnetic material. The actuator 114 could comprise, for example, bending piezo components. For example, in this case at least one movement of at least one deflection unit could be effectuated resonantly by using an AC component of the corresponding driver signal. For this purpose, the frequency of the AC driver signal can be tuned to the natural frequency of a fiber, etc., as an elastic suspension of the at least one deflection unit. It would also be possible that the driver signal has a DC component: In this case, a specific bending of the bending piezoactuators could be effectuated or, for example, a specific magnetic field strength. The DC component can be overlaid as an offset or reference line of an AC component.

In some examples, instead of a deflection unit 112, an array manufactured integrated on a substrate—for example, silicon—made of multiple emitter structures—for example, optical waveguides—could be used, wherein the multiple emitter structures emit laser light in a specific phase relationship. By varying the phase relationship of the laser light, which is emitted by the various emitter structures, a specific emission angle can then be set by constructive and destructive interference. Such arrangements are also sometimes referred to as an optical phased array (OPA). See M. J. R. Heck "Highly integrated optical phased arrays: photonic integrated circuits for optical beam shaping and beam steering" in Nanophotonics (2016).

The laser scanner 101 also comprises a detector 113. For example, the detector 113 can be implemented by a photodiode. For example, the detector 113 can be implemented by a photodiode array. For example, the detector 113 can have one or more single photon avalanche diodes (SPAD).

The detector 113 is configured to detect secondary laser light 192 reflected from objects (not shown in FIG. 2) in the surroundings of the arrangement 100. Based on a runtime measurement between the emission of a pulse of the primary laser light 191 by the laser light source 111 and the detection of the pulse by the detector 113, a measurement of distances to the objects can then be carried out. Such technologies could also, for example, be combined with or replaced by structured illumination, in which continuous laser light can be used instead of pulses of the laser light 191.

In the example of FIG. 2, the detector 113 has a separate aperture 113A. In other examples, it would be possible that the detector 113 uses the same aperture which is also used for the emission of the primary laser light 191. A particularly high sensitivity can then be achieved.

The laser scanner 101 could optionally also have a positioning device (not shown in FIG. 2). The positioning device can be configured to output a signal which is indicative of the emission angle at which the laser light is emitted. For this purpose, it would be possible, for example, that the positioning device performs a state measurement of the actuator 114 and/or the deflection unit 112. The positioning device could also measure the primary laser light 191 directly, for example. The positioning device can in general measure the emission angle optically, for example, based on the primary laser light 191 and/or light of a light-emitting diode. For example, the positioning device could have a position-sensitive detector (position-sensitive device, PSD), which has, for example, a PIN diode, a CCD array, or a CMOS array. The primary laser light 191 and/or light from a light-emitting diode could then be directed via the deflection unit 112 onto the PSD, so that the emission angle can be measured by means of the PSD. Alternatively or additionally, the positioning device could also have a fiber Bragg grating, which is arranged, for example, inside the fiber which forms the deflection unit 112: the length of the fiber Bragg grating can change due to a curvature and/or torsion of the fiber and the reflectivity for light of a specific wavelength can thus be changed. The movement state of the fiber can thus be measured. The emission angle may be inferred therefrom.

Figure 3:
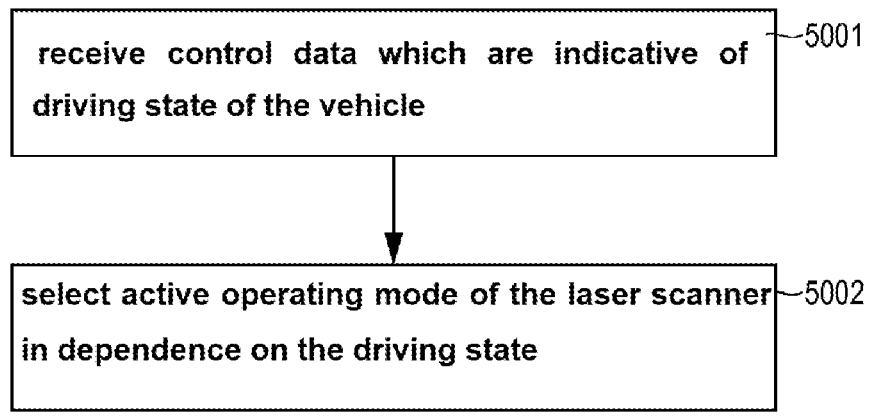
FIG. 3 is a flowchart of a method according to various embodiments.

FIG. 3 is a flowchart of a method according to various examples. For example, the method according to FIG. 3 could be implemented by a device 100 as described above with reference to FIGS. 1 and 2.

Firstly, in block 5001, the reception of control data occurs. The control data are indicative of a driving state of a vehicle. For example, the control data could be received via a bus data connection, for example, a CAN bus or a MOST bus or a FlexRay bus. For example, the control data could be received via a packetized data connection. However, it would also be possible that the control data are coded as an analog signal.

In block 5002, the selection of an active operating mode of a laser scanner is then performed in dependence on the driving state, as is indicated by the control data in block 5001.

In this case, for example, by means of a lookup table or in another manner, a specific association can be implemented between one or more driving states of the vehicle and the respective activated operating mode of the laser scanner. For example, specific logical linkages between various driving states of the vehicle can be taken into consideration.

The scanning of laser light—for example, pulsed laser light—can then optionally be performed along a first scanning axis and optionally along a second scanning axis in accordance with the activated operating mode of the laser scanner.

A measurement of distances to objects in the surroundings can then optionally be carried out. For this purpose, for example, runtime measurements of pulses of the laser light could be taken into consideration. However, technologies of structured illumination could also be used.

Figures 4, 5:
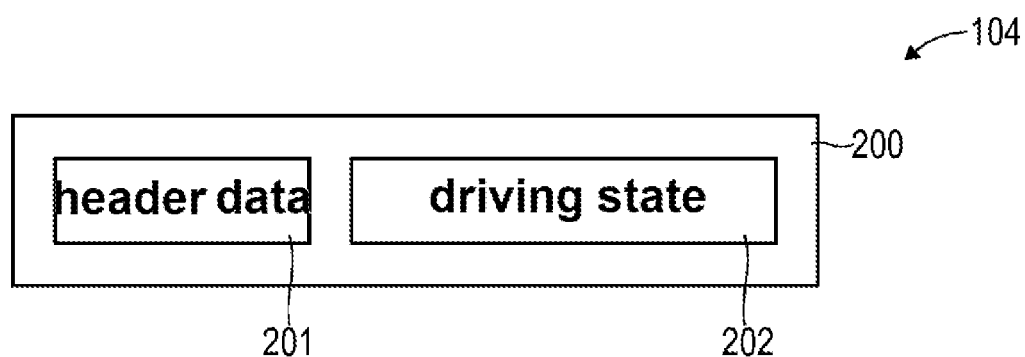
FIG. 4 schematically illustrates the control data according to various embodiments.
FIG. 5 schematically illustrates the driving state of the vehicle according to various embodiments.

FIG. 4 illustrates aspects with respect to control data 104, which are indicative of a driving state of a vehicle. In the example of FIG. 4, the control data 104 are digitally coded. In the example of FIG. 4, the control data 104 are implemented as data packets 200. Such a data packet 200 comprises header data 201 (header) and furthermore comprises useful data (payload data). The useful data are indicative of the driving state 202 of the vehicle.

FIG. 5 illustrates aspects with respect to the driving state 202 of the vehicle. In the example of FIG. 5, the driving state 202 of the vehicle is classified by three criteria. In other examples, fewer or more criteria could also be used for classification of the driving state. For example, only a single criterion could also be used.

In the example of FIG. 5, the driving state 202 is firstly classified by a road type, on which the vehicle is presently moving. For example, the road type could be determined from map data of a navigation database, for example, in conjunction with a satellite navigation system. The road type could described, for example, various road classes, such as freeway (cf. FIG. 5), state highway, local road, country road, federal highway, etc.

In the example of FIG. 5, the driving state 202 is furthermore classified by a speed of the vehicle. The speed can be obtained, for example, by reading out a speedometer.

In the example of FIG. 5, the driving state 202 is furthermore classified by a yaw rate of the vehicle. For example, the yaw rate could be obtained by reading out an acceleration sensor. Alternatively or additionally to the yaw rate, the pitch angle or the roll angle of the vehicle could also be used for classification of the driving state.

The driving state 202 can also be described by observables other than those which are illustrated in the example of FIG. 5. Examples comprise a height profile of a road, for example, a pitch angle of the road.

Further examples of the driving state 202 comprise a weather situation, for example, rain, snow, night, sunshine, dryness, ambient humidity, ambient brightness, etc.

Such examples of the driving state 202 can be combined with one another flexibly depending on the application.

Figure 6:
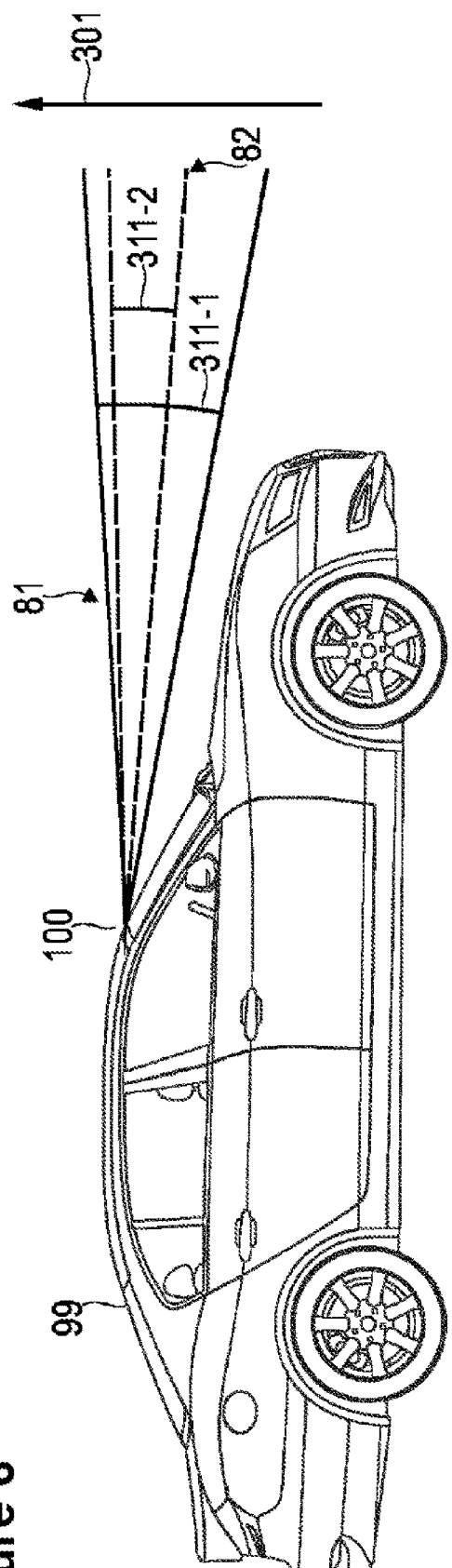

FIG. 6 illustrates aspects with respect to an integration of the device 100 in a motor vehicle 99. In the example of FIG. 6, the device 100 is integrated into a passenger automobile. FIG. 6 is a side view of the passenger automobile 99. In the example of FIG. 6, the device 100 is attached in an upper, middle region of the front windshield of the passenger automobile 99. In other examples, the device 100 could also be attached at other positions of the passenger automobile 99, for example, in the region of a front bumper, a rear bumper, in the region of a radiator grill, etc.

FIG. 6 furthermore illustrates aspects with respect to a vertical scanning axis 301 of the laser scanner 100. When the device 100 is installed as intended in the passenger automobile 99, the scanning axis 301 is oriented vertically in the corresponding coordinate system of the passenger automobile 99, i.e., approximately perpendicularly to the road.

Two different dimensions 311-1, 311-2 of the scanning region along the vertical scanning axis 301 are illustrated in the example of FIG. 6. It is apparent from the example of FIG. 6 that the dimension 311-1 is larger than the dimension 311-2.

For example, it would be possible that the two dimensions 311-1, 311-2 are each associated with different operating modes 81, 82 of the laser scanner 101. For example, the dimension 311-1 (solid line in FIG. 6) could be activated in conjunction with an operating mode 81 which corresponds to driving on inner-city streets and/or in conjunction with lower speeds of the passenger automobile 99. For example, the dimension 311-2 (dashed line in FIG. 6) could be activated in conjunction with an operating mode 82 which corresponds to driving on the freeway and/or in conjunction with higher speeds of the passenger automobile 99.

This is based on the finding that when driving at high speeds or on the freeway, objects typically have to be detected at a greater distance from the device 100. It can therefore be desirable to dimension the dimension 311-2 of the scanning region along the vertical scanning axis 301 as comparatively small in order to obtain a high resolution—for example, a high scanning point density—at long range and/or to avoid the unnecessary acquisition of LIDAR data at short range.

In a further example, the access to a spectrum of the laser light could be reduced by a smaller scanning region. Interference (crosstalk) with other vehicles, which also embody LIDAR technologies in the same spectrum, can thus be reduced. A reduction of the dimensions of the scanning region can therefore also be desirable, for example, in an inner-city driving state. The access to the spectrum can generally be reduced not only by the dimensions of the scanning region (for example, at fixed scanning point density), however, but rather alternatively or additionally also by a reduction of the image repetition rate, the scanning point density, the pulse energy, etc.

Figure 7:
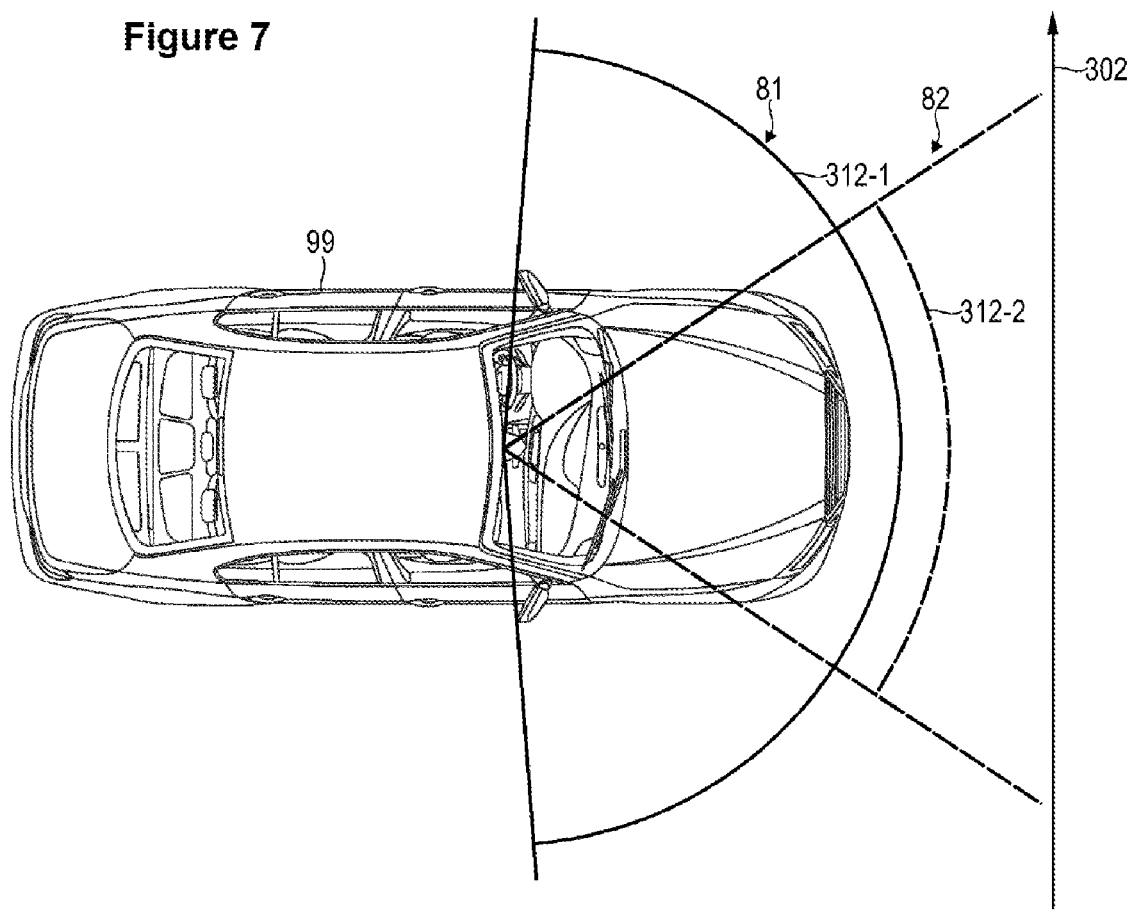

FIG. 7 illustrates aspects with respect to an integration of the device 100 in the passenger automobile 99. FIG. 7 is a top view of the passenger automobile 99. The scenario of FIG. 7 corresponds to the scenario of FIG. 6.

FIG. 7 furthermore illustrates aspects with respect to a horizontal scanning axis 302 of the laser scanner 100. If the device 100 is installed as intended in the passenger automobile 99, the scanning axis 302 is oriented with the horizontal coordinate system of the passenger automobile 99, i.e., approximately parallel to the road.

In the example of FIG. 7, the dimension 312-1 of the scanning region along the horizontal scanning axis 302 is shown. Moreover, the dimension 312-2 of the scanning region of the horizontal scanning axis 302 is shown. It is apparent from the example of FIG. 7 that the dimension 312-1 is larger than the dimension 312-2.

For example, it would be possible that the dimensions 312-1, 312-2 are associated with different operating modes 81, 82 of the laser scanner 101. For example, the dimension 312-1 could be activated in conjunction with driving on inner-city streets and/or in conjunction with an operating mode 81, which corresponds to speeds of the passenger automobile 99 below a threshold value. For example, the dimension 312-2 could be activated in conjunction with an operating mode 82, which corresponds to driving on the freeway and/or greater speeds of the passenger automobile 99.

This is based on the finding that when driving at high speeds and/or on the freeway, objects often have to be detected in front of the passenger automobile 99, but objects to the left and right of the passenger automobile 99 do not have to be detected. Therefore, it can be desirable to dimension the dimension 312-2 of the scanning region along the horizontal scanning axis 302 comparatively small, in order to obtain a high resolution—for example, a high scanning point density—at long range and/or to avoid the unnecessary acquisition of LIDAR data at close range to the left and right of the passenger automobile 99. An image repetition rate can thus be increased, for example.

FIG. 8 illustrates aspects with respect to the scanning region 315. FIG. 8 is a polar plot along the vertical scanning axis 301 and the horizontal scanning axis 302. The scenario of FIG. 8 fundamentally corresponds to the scenarios of FIGS. 6 and 7. It is apparent from FIG. 8 that depending on the operating mode 81, 82 of the laser scanner 101, both the dimension 311-1, 311-2 along the vertical scanning axis 301 can be changed, and also the dimension 312-1, 312-2 along the horizontal scanning axis 302.

FIG. 9 illustrates aspects with respect to the scanning region 315. FIG. 9 is a polar plot along the vertical scanning axis 301 and the horizontal scanning axis 302. The scenario of FIG. 9 fundamentally corresponds to the scenarios of FIGS. 6-8. In the example of FIG. 9, however, depending on the operating mode 81, 82 of the laser scanner 101, only the dimension 311-1, 311-2 of the scanning region 315 along the vertical scanning axis 301 is adapted; the dimension 312 of the scanning region 315 along the horizontal scanning axis 302 is not adapted.

Different combinations are conceivable with respect to the adaptation of the scanning region 315 in dependence on the operating mode 81, 82. For example, the dimension of the scanning region 315 along the vertical scanning axis 301 could be adapted and the dimension of the scanning region 315 along the horizontal scanning axis 302 could not be adapted. It would also be possible that the dimension of the scanning region 315 along the vertical scanning axis 301 remains constant, but the dimension of the scanning region 315 along the horizontal scanning axis 302 is adapted.

It was described above in various examples how the dimensions of the scanning region 315 can be adapted. However, it would also be possible that different operating modes 81, 82 of the laser scanner 101 are alternatively or additionally also associated with other properties of the scanning region 315. For example, it would be possible that different operating modes 81, 82 of the laser scanner 101 are associated with a scanning sequence of various scanning points within the scanning region 315 (scanning trajectory). Alternatively or additionally, it would be possible that different operating modes 81, 82 of the laser scanner 101 are associated with different alignments of the scanning region 315 along one or more scanning axes 301, 302.

Figure 10:
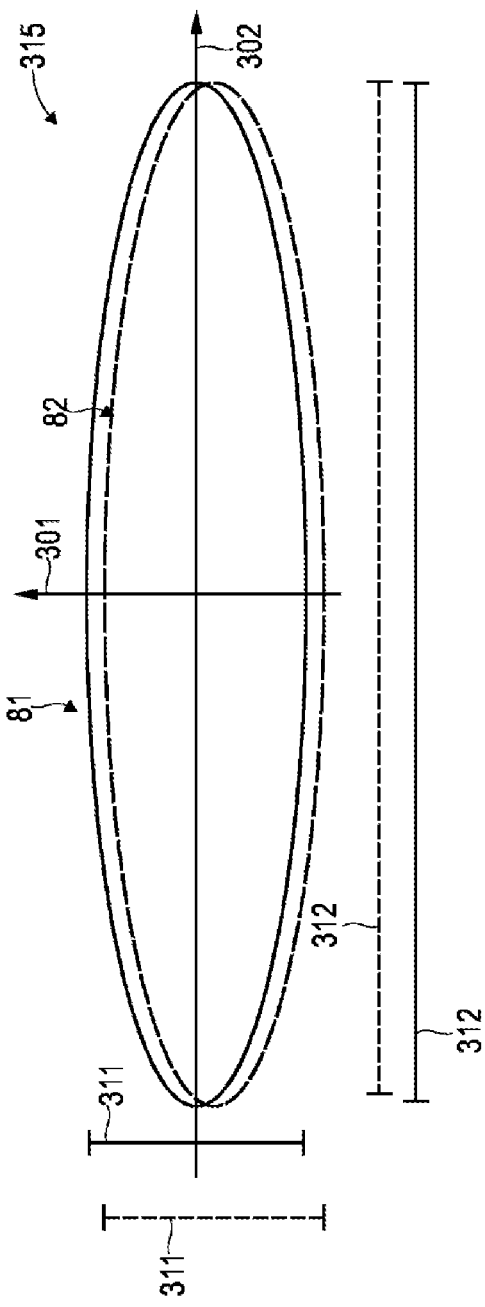
FIG. 10 illustrates a scanning region defined by the vertical scanning axis and the horizontal scanning axis according to various embodiments, the alignment of which varies in dependence on an operating state of the laser scanner.

FIG. 10 illustrates aspects with respect to the scanning region 315. FIG. 10 is a polar plot along the vertical scanning axis 301 and the horizontal scanning axis 302. In the example of FIG. 10, the alignment of the scanning region 315 in the coordinate system defined by the scanning axes 301, 302 is changed depending on the operating mode 81, 82 of the laser scanner 101. It is apparent from FIG. 10 that the dimensions 311, 312 of the scanning region 315 remain constant.

In the example of FIG. 10, a center of the scanning region 315 is displaced depending on the operating mode of the laser scanner 101. This can correspond, for example, to a non-dynamic offset of the deflection unit 112. In particular, in the example of FIG. 10, the center of the scanning region 315 is displaced along the vertical scanning axis 302. For example, such a displacement of the scanning region 315 could be used in order to compensate for a yaw angle, roll angle, and/or pitch angle of the passenger automobile 99.

The displacement of the center of the scanning region can be achieved, for example, by a DC component of a magnetic field of the actuator (cf. inset of FIG. 10). The displacement of the center of the scanning region could also be achieved by a DC component of the deflection of bending piezoactuators. In general, such a DC component of the driver signal of the excitation can thus be overlaid with an AC component 862 of the driver signal which effectuates, for example, the resonant movement for scanning the scanning axes 301, 302.

For example, a zoom functionality could be implemented by combination of the example of FIG. 9 with the example of FIG. 10: the scanning region can be focused on a specific region by varying both the dimensions and also the alignment of a scanning region.

Figure 11:
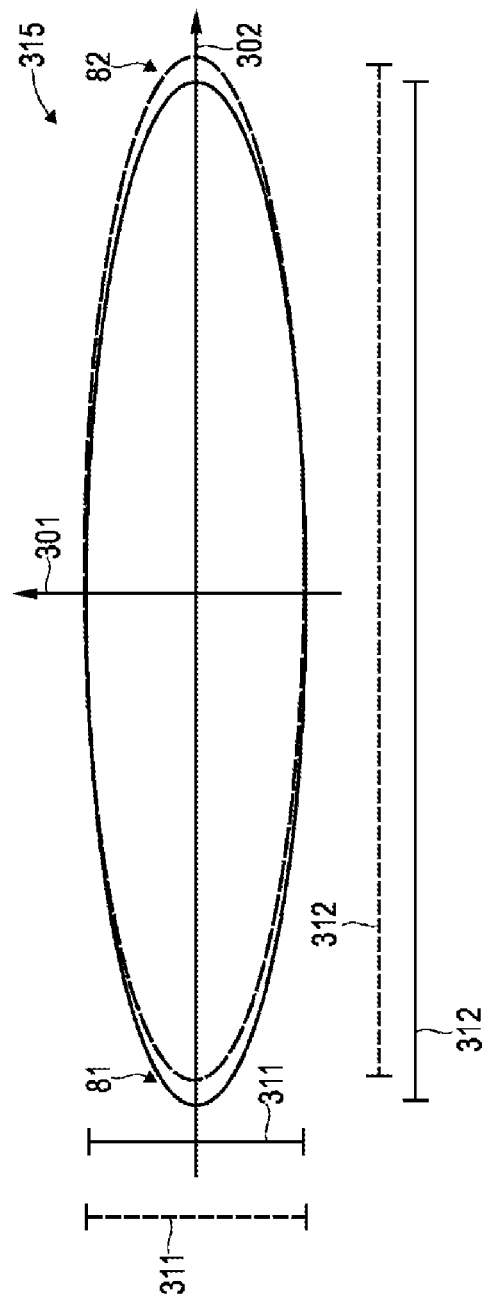
FIG. 11 illustrates a scanning region defined by the vertical scanning axis and the horizontal scanning axis according to various embodiments, the dimensions of which vary in dependence on an operating state of the laser scanner.

FIG. 11 illustrates aspects with respect to the scanning region 315. FIG. 11 is a polar plot along the vertical scanning axis 301 and the horizontal scanning axis 302. In the example of FIG. 11, the alignment of the scanning region 315 in the coordinate system defined by the scanning axes 301, 302 is changed depending on the operating mode 81, 82 of the laser scanner 101. It is apparent from FIG. 11 that the dimensions 311, 312 of the scanning region 315 remain constant.

In the example of FIG. 11, a center of the scanning region 315 is displaced depending on the operating mode 81, 82 of the laser scanner 101. In particular, the center of the scanning region 315 is displaced along the horizontal scanning axis 302 in the example of FIG. 11. For example, such a displacement of the scanning region 315 could be used in order to compensate for a yaw angle, roll angle, and/or pitch angle of the passenger automobile 99.

In various examples, it would be possible to combine the implementations according to above-discussed FIGS. 6-11 with one another.

Figure 12:
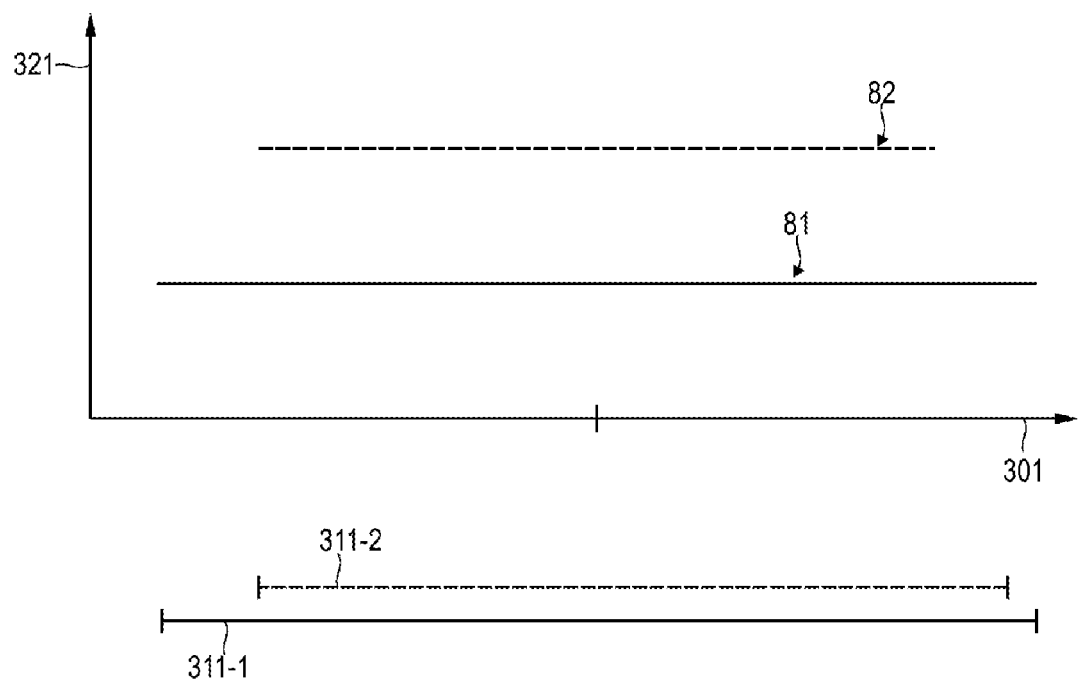
FIG. 12 schematically illustrates a scanning point density along the vertical scanning axis according to various embodiments, wherein the scanning point density varies in dependence on an operating state of the laser scanner.

FIG. 12 illustrates aspects with respect to a scanning point density 321. FIG. 12 illustrates the scanning point density 321 along the vertical scanning axis 301 for various operating modes 81, 82. It is apparent in the example of FIG. 12 that different operating modes 81, 82 can implement different scanning point densities along the vertical scanning axis 301.

By implementing different scanning point densities 321, it is possible that, for example, for distance measurements of objects at greater distance, a sufficiently large number of scanning points per object can be achieved.

In the example of FIG. 12, the scanning point density 321 is constant along the vertical scanning axis 301. However, it would also be possible that the scanning point density 321 varies along the vertical scanning axis 301. For example, it would be possible that the variation of the scanning point density 321 along the vertical scanning axis 301 is implemented differently for different operating modes.

Figure 13:
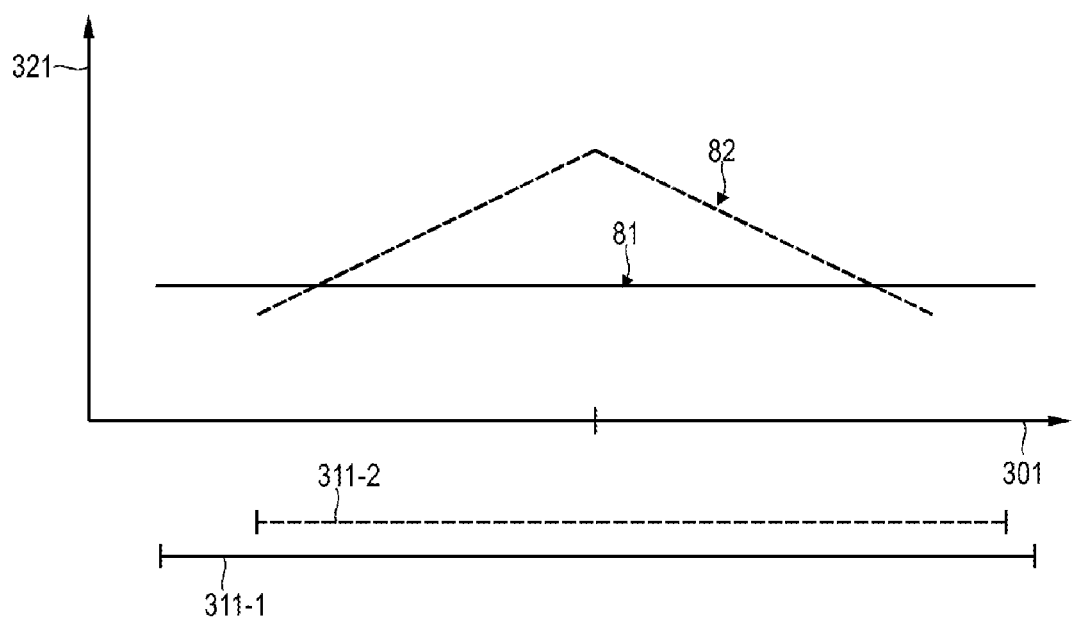
FIG. 13 schematically illustrates a scanning point density along the vertical scanning axis according to various embodiments, wherein the scanning point density varies in dependence on an operating state of the laser scanner.

FIG. 13 illustrates aspects with respect to a scanning point density 321. FIG. 13 illustrates the scanning point density 321 along the vertical scanning axis 301 for various operating modes 81, 82. It is apparent in the example of FIG. 13 that different operating modes 81, 82 can implement different scanning point densities 321 along the vertical scanning axis 301. In the example of FIG. 13, the scanning point density 321 of the operating mode 82 (dashed line) has a characteristic variation along the vertical scanning axis 301, i.e., in general different variations of the scanning point density 321 are implemented for different operating modes 81, 82.

For example, a scenario according to the example of FIG. 13 can be desirable in particular in conjunction with the differentiation between a driving situation on a freeway and/or at high speeds of the passenger automobile 99 in relation to a driving situation on an inner-city street and/or at low speeds of the passenger automobile 99. For example, at high speeds, a high scanning point density 321 can be desirable in particular in a central region of the scanning region 315; the central region typically corresponds to long distances of the corresponding objects. However, if the objects are expected comparatively close to the passenger automobile 99, a homogeneous scanning point density 321 can be desirable: this is typically the case in conjunction with low speeds of the passenger automobile 99.

While examples of the scanning point density 321 along the vertical scanning axis 301 were discussed above with respect to FIGS. 12 and 13, it can alternatively or additionally be possible to implement the scanning point density along a further scanning axis, for example, the horizontal scanning axis 302, for different operating modes 81, 82.

Different scanning point densities can correspond, for example, to different spacings of adjacent scanning lines. The scanning point density can describe, for example, a spacing of adjacent emission angles for pulsed laser light 191. The scanning point density can describe, for example, an angle resolution of the scanning.

Different scanning point densities can be achieved, for example, by different step widths of a stepped movement along a degree of freedom of the movement which is associated with the corresponding scanning axis 301, 302.

Figure 14:
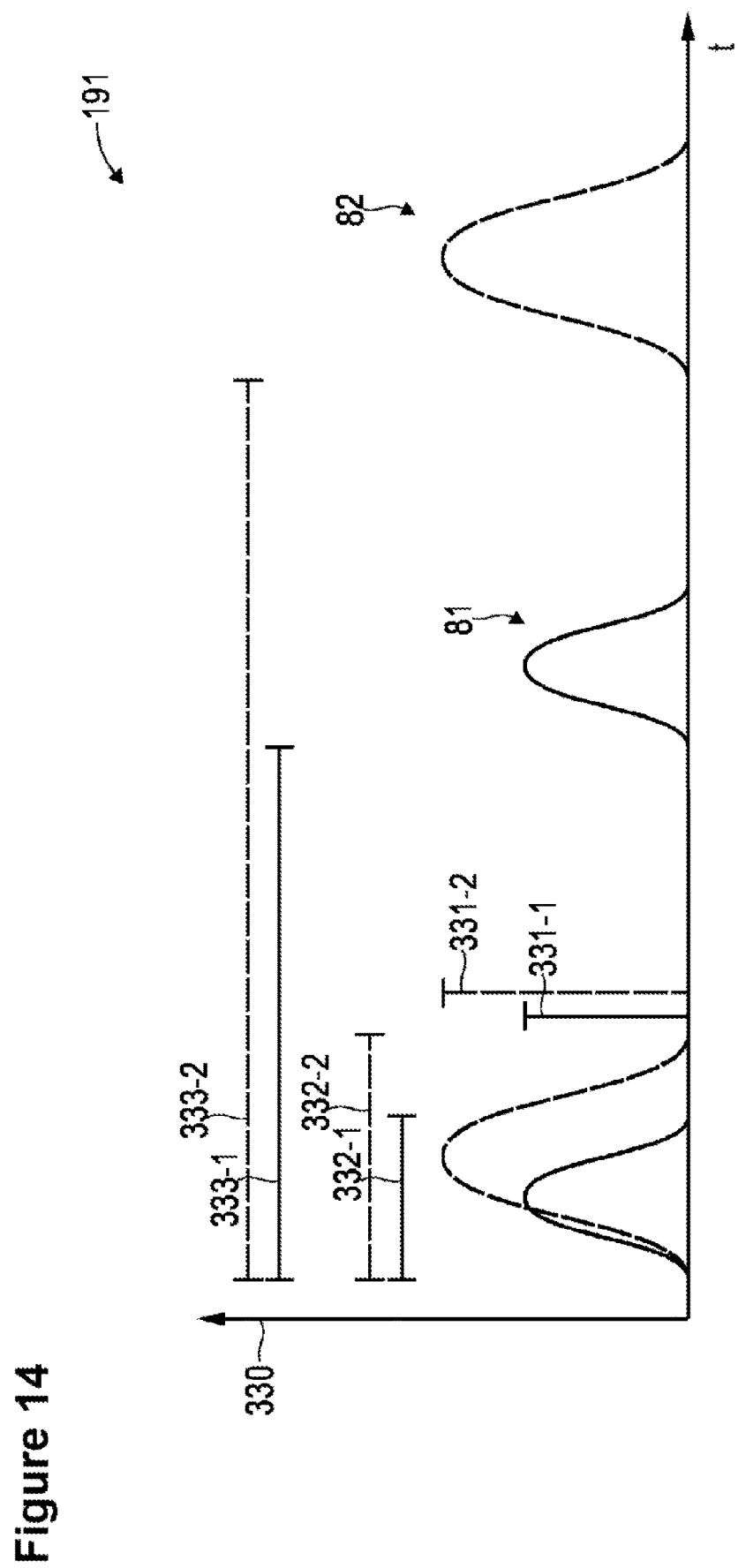
FIG. 14 schematically illustrates a pulse sequence of the laser light according to various embodiments, wherein the pulse energy of the pulses of the pulse sequence and the repetition rate of the pulses of the pulse sequence vary in dependence on an operating state of the laser scanner.

FIG. 14 illustrates aspects with respect to the primary laser light 191, which is emitted by the laser light source 111 of the laser scanner 101. FIG. 14 illustrates the amplitude 330 of the laser light 191 as a function of time.

In FIG. 14, a pulse sequence of the laser light 191 is shown for an operating mode 81 (solid line) and an operating mode 82 (dashed line). It is apparent from FIG. 14 that the two operating modes 81, 82 implement different pulse energies of the pulses of the laser light 191 (the pulse energy is proportional to the area below the curves in FIG. 14). This is achieved by different peak amplitudes 331-1, 331-2, and also by different pulse durations 332-1, 332-2. In other examples, it would also be possible that either the peak amplitude or the pulse duration is changed in dependence on the operating mode 81, 82.

In the example of FIG. 14, the two operating modes 81, 82 are additionally associated with different repetition rates 333-1, 333-2 of the pulses of the laser light 191. This is optional. For example, it would be possible that a duty cycle of the pulse sequence is changed in dependence on the operating mode 81, 82.

By adapting the pulse sequence of the laser light 191, it is possible that, for example, particularly long ranges for the distance measurement can be achieved if needed. Long ranges for the distance measurement can be achieved, for example, by a high pulse energy. A higher pulse energy can often be accompanied by a lower depth resolution, i.e., a lower accuracy at which the distance of the objects can be determined. However, in the case of distance measurements of objects located comparatively far away—for example, at a distance in the range of 100-400 m—achieving a particularly high accuracy in the determination of the distance can be unnecessary.

At the same time, specific limiting values for the eye safety, which are defined depending on the situation, for example (for example, stricter limiting values in urban areas in comparison to limiting values on the freeway) can each be utilized well.

Furthermore, it is possible that the access to the spectrum of the laser light can thus be minimized. Interference with laser scanners and other vehicles can thus be reduced. This can be desirable in particular in conjunction with inner-city traffic, where a high density of vehicles can exist; for example, in comparison to a situation on freeways, where the vehicles progress in an orderly fashion and separated according to the driving direction.

Figure 15:
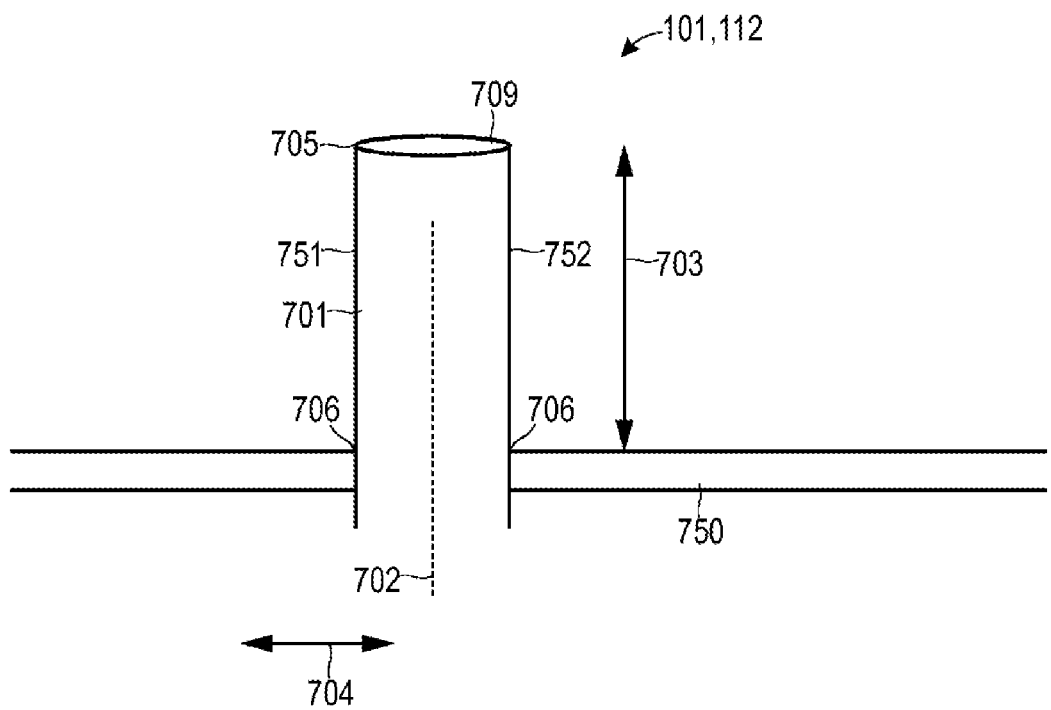
FIG. 15 schematically illustrates a fiber, which implements a deflection unit of the laser scanner according to various embodiments.

FIG. 15 illustrates aspects with respect to the device 100. In particular, FIG. 15 illustrates aspects with respect to the laser scanner 101. In the example of FIG. 15, the laser scanner 101 comprises a fiber 701. The fiber 701 implements the deflection unit 112. This means that the fiber 701 can be configured to deflect the laser light 191.

The fiber 701 extends along a central axis 702. The fiber 701 comprises a movable end 705 having an end face 709.

In addition, a fixation 750 of the device 100 is shown. For example, the fixation 750 could be manufactured from plastic or metal. The fixation 750 could, for example, be part of a housing which accommodates the movable end 705 of the fiber 701.

The fixation 750 fixes the fiber 701 on a fixation point 706. For example, the fixation 750 could fix the fiber 701 on the fixation point 706 by a clamp connection and/or a soldered bond and/or an adhesive bond. The fiber 701 is therefore coupled fixed in place and/or rigidly to the fixation 750 in the region of the fixation point 706.

Furthermore, the length 703 of the fiber 701 between the fixation point 706 and the movable end 705 is shown in FIG.

15. It is apparent from FIG. 15 that the movable end 705 is spaced apart from the fixation point 706. For example, the length 703 could be in the range of 0.5 cm to 10 cm, optionally in the range of 5 cm to 8 cm.

The movable end 705 thus stands freely in space. Due to this spacing of the movable end 705 from the fixation point 706, it is possible that the position of the movable end 705 of the fiber 701 can be changed in relation to the fixation point 706. It is possible in this case, for example, to curve and/or twist the fiber 701 in the region between the fixation point 706 and the movable end 705. However, a rest state of the fiber 701 without movement or deflection is shown in FIG. 15.

Figure 16:
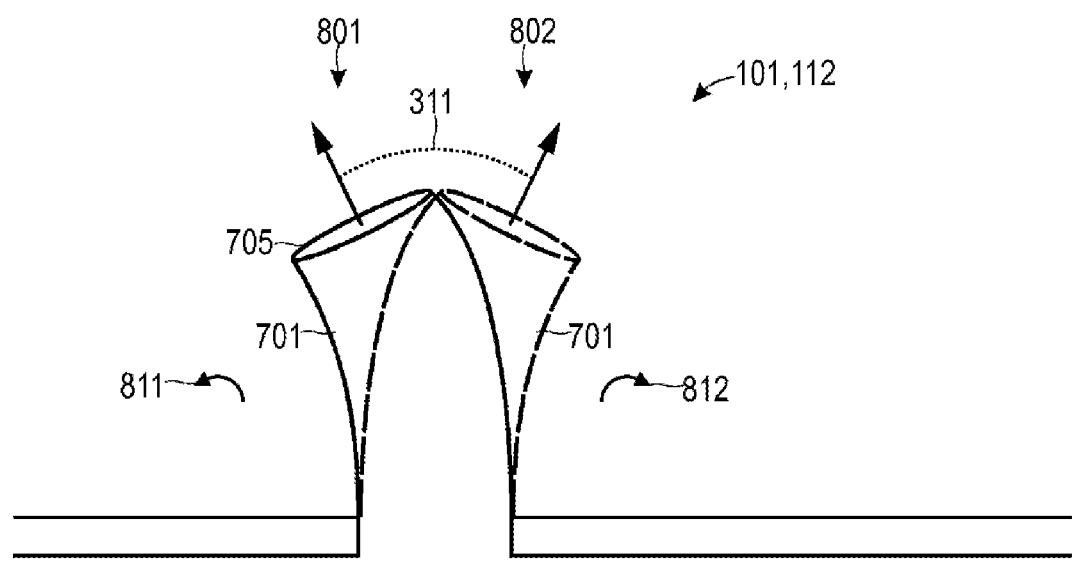
FIG. 16 schematically illustrates a transverse mode of the fiber according to FIG. 15.

FIG. 16 illustrates aspects with respect to the device 100. In particular, FIG. 16 illustrates aspects with respect to the laser scanner 101. In the example of FIG. 16, the deflection unit 112 comprises a fiber 701. The example of FIG. 16 corresponds to the example of FIG. 15. FIG. 16 shows a dynamic state of the deflection unit.

In the example of FIG. 16, the end 705 of the fiber 701 is shown in a position 801 and a position 802 (dashed line in FIG. 16). These positions 801, 802 implement extreme positions of the fiber 701: for example, a stop could be provided, which prevents a further movement of the end 705 beyond the positions 801, 802 (not shown in FIG. 16). The fiber 701 can move back and forth between the positions 801, 802, for example, periodically. In the example of FIG. 16, the position 801 corresponds to a curvature 811. The position 802 corresponds to a curvature 812. The curvatures 811, 812 have opposing signs. The actuator 114 (not shown in FIG. 16) can be provided for moving the fiber 701 between the positions 801, 802. The movement of the fiber 701 between the positions 801, 802 corresponds to a transverse mode of the fiber 701 defined in the plane of the drawing of FIG. 16.

It would alternatively or additionally be possible to use a transverse mode of the fiber 701 defined perpendicularly to the plane of the drawing of FIG. 16 for scanning the laser light 191. For example, instead of a one-dimensional movement (as shown in FIG. 16), a two-dimensional movement overlaid in position and time having a component perpendicular to the plane of the drawing of FIG. 16 would also be possible. In this manner, for example, a superposition figure can be implemented, by the orthogonal degrees of freedom of the movement being excited in accordance with transverse modes oriented perpendicularly to one another.

By providing the curvatures 811, 812 in the positions 801, 802, the laser light 191 can be emitted over a specific scanning region 315 having a dimension 311. In the example of FIG. 16, the illustrated transverse mode implements the vertical scanning axis 301. However, it would also be possible that the illustrated transverse mode implements the horizontal scanning axis 302.

Figure 17:
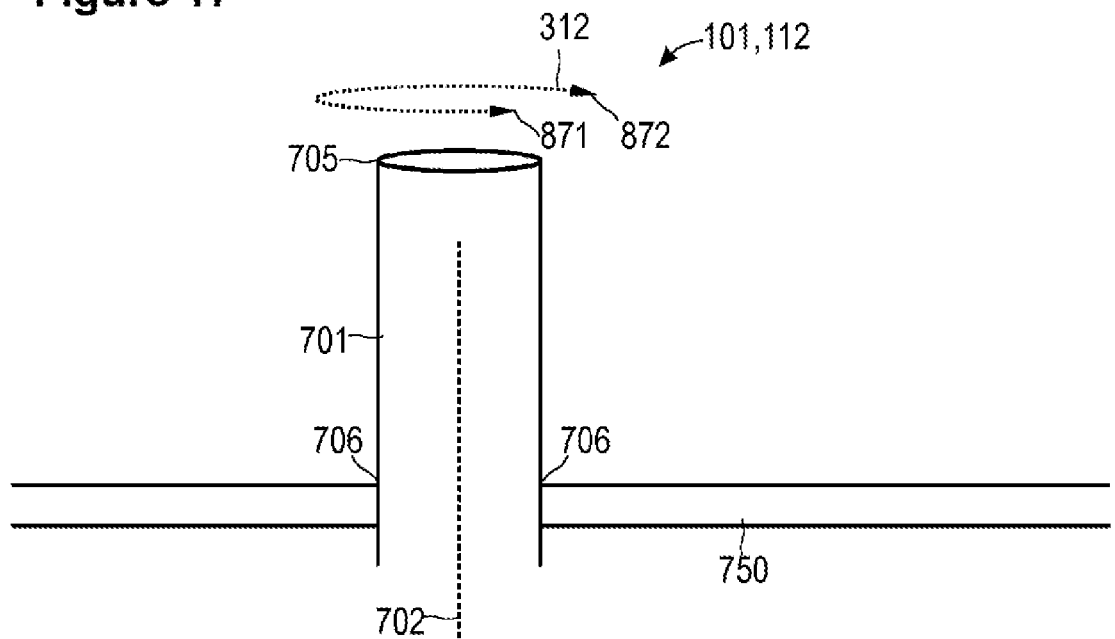
FIG. 17 schematically illustrates a torsion mode of the fiber according to FIG. 15.

FIG. 17 illustrates aspects with respect to the device 100. In particular, FIG. 17 illustrates aspects with respect to the laser scanner 101. In the example of FIG. 17, the deflection unit 112 again comprises the fiber 701. The example of FIG. 17 corresponds in principle to the examples of FIGS. 15 and 16. FIG. 17 shows a dynamic state of the deflection unit 112.

In the example of FIG. 17, the movable end 705 of the fiber 701 is moved in such a way that the fiber 701 moves, in the region between the fixation point 706 and the movable end 705, between a first torsion 871 and a second torsion 872. This corresponds to twisting of the fiber 701 along the central axis 702. The fiber 701 is thus excited according to a torsion mode.

By providing the torsions 871, 872, it is possible for laser light 191 (not shown in FIG. 17) to be able to be emitted over a corresponding scanning region having a dimension 312.

In the example of FIG. 17, the illustrated torsion mode implements the horizontal scanning axis 302. However, it would also be possible that the illustrated torsion mode implements the vertical scanning axis 301.

Figure 18:
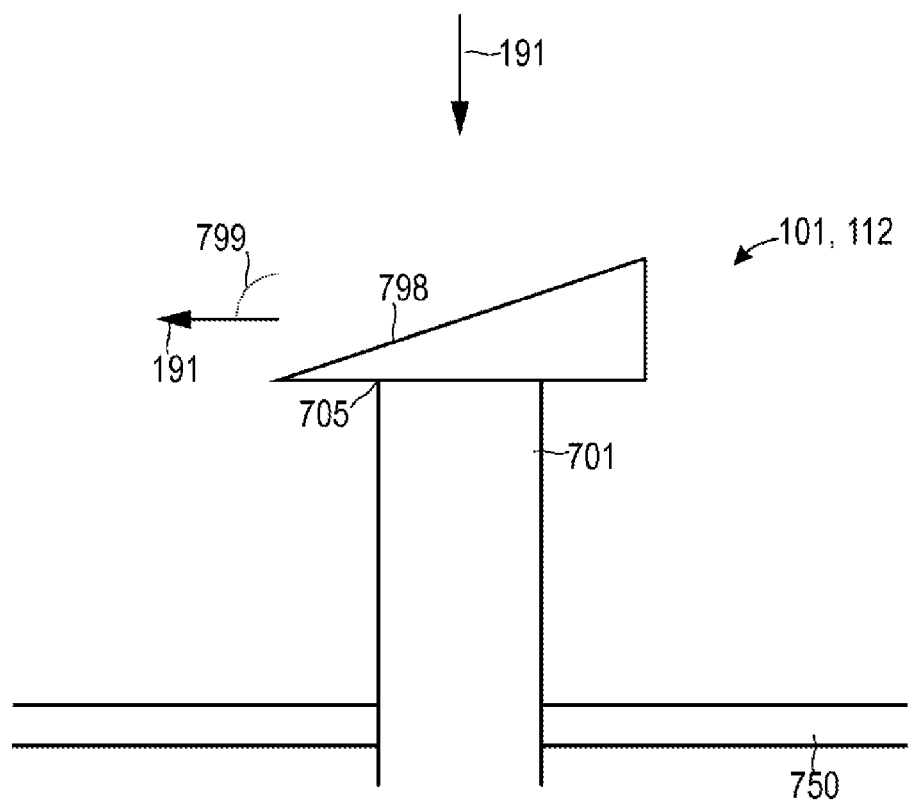
FIG. 18 schematically illustrates a mirror, which is connected to a movable end of the fiber according to FIG. 15.

FIG. 18 illustrates aspects with respect to the device 100. In particular, FIG. 18 illustrates aspects with respect to the deflection unit 112. In the example of FIG. 18, the deflection unit 112 comprises the fiber 701, which can be moved, for example, according to one or more transverse modes and/or according to one or more torsion modes. In the example of FIG. 18, the deflection unit 112 furthermore comprises a mirror 798, which is rigidly attached on the movable end 705 of the fiber 701. The mirror surface 798A of the mirror 798 is illuminated in the example of FIG. 18 from the front with the laser light 191, wherein the laser light 191 does not run through an optical waveguide of the fiber 701. A deflection angle 799 of the laser light 191 is thus effectuated. The deflection angle 799 is dependent in this case on the curvature 811, 812 and/or the torsion 871, 872 of the fiber 701. For example, instead of a mirror 798, a prism could also be used to implement the deflection angle 799. It is apparent from FIG. 18 that the fiber 701 extends away from the rear side 798B of the mirror 798. Such a rear suspension can enable larger scanning regions—for example, in comparison to an in-plane suspension.

Figure 19:
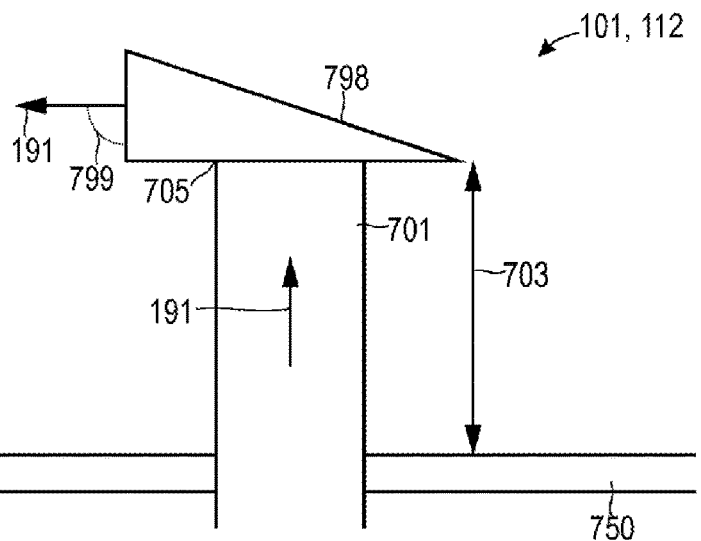
FIG. 19 schematically illustrates a mirror, which is connected to a movable end of the fiber according to FIG. 15.

FIG. 19 illustrates aspects with respect to the device 100. In particular, FIG. 19 illustrates aspects with respect to the deflection unit 112. In the example of FIG. 19, the deflection unit 112 comprises the fiber 701, which can be moved, for example, according to one or more transverse modes and/or according to one or more torsion modes. In the example of FIG. 19, the deflection unit 112 furthermore comprises a mirror 798, which is rigidly attached to the movable end 705 of the fiber 701. Alternatively or additionally, a lens could also be provided as an optical element, for example, a GRIN lens. The mirror 798 is illuminated in the example of FIG. 19 with laser light 191, wherein the laser light 191 runs through an optical waveguide of the fiber 701. The deflection angle 799 of the laser light 191 is thus effectuated. The deflection angle 799 is again dependent in this case on the curvature 811, 812 and/or the torsion 871, 872 of the fiber 701. For example, instead of a mirror 798, a prism could also be used to implement the deflection angle 799.

Figure 20:
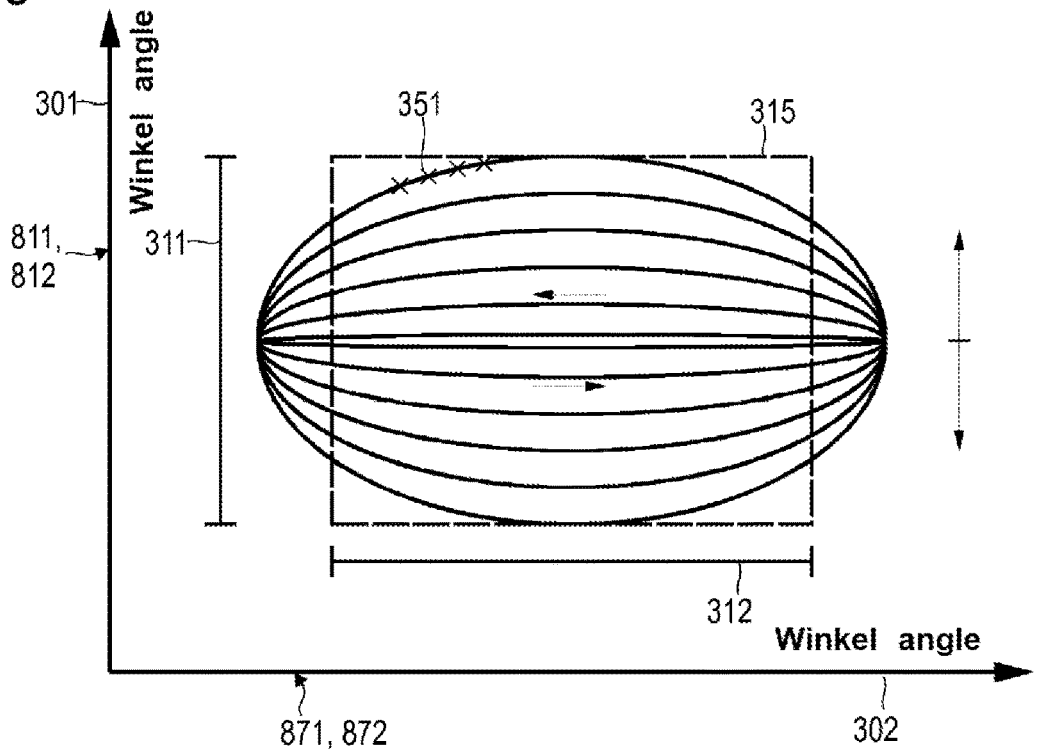
FIG. 20 schematically illustrates a superposition figure, which is obtained by resonant excitation of two degrees of freedom of the movement of the fiber according to FIG. 15.

FIG. 20 illustrates aspects with respect to the scanning of the surroundings of the device 100 by moving the fiber 701. In particular, FIG. 20 illustrates a superposition figure which is obtained when a first movement of the fiber along the scanning axis 301 is overlaid with a second movement of the fiber 702 (horizontal axis in FIG. 20) during a duration of variable amplitude. The superposition of the movements means that the movements are executed and/or are excited by the actuator 114 at least partially parallel in time and overlaid in the position space during the duration.

In the example of FIG. 20, the torsion 871, 872 of the fiber 701—which defines the dimension 312 of the scanning region 315—is overlaid with the curvature 811, 812 of the fiber 701. This means that one of the two overlaid degrees of freedom of the movement corresponds to a transverse mode of the fiber 701—for example, first or second order; and also the other of the two overlaid degrees of freedom of the movement corresponds to a torsion mode of the fiber 701—for example, first order. The horizontal arrows in FIG. 20 illustrates the direction of the scanning of the superposition figure. A particularly large scanning region 315 may be implemented by the superposition of the resonantly effectuated transverse modes with the torsion mode.

In this case, the amplitude of the curvature 811, 812 is gradually increased over the duration which is formed by the superposition figure. The "eye" of the superposition figure thus widens toward larger deflection angles (illustrated in FIG. 20 by the vertical dashed arrows). The maximum amplitude of the curvature 811, 812 corresponds in this case to the dimension 311 of the scanning region 315.

At the same time, in the example of FIG. 20, the amplitude of the torsion 871, 872 of the fiber 701 (horizontal axis in FIG. 20) is not changed and is therefore constant. The superposition figure therefore has a fixed left-right extension in FIG. 20, which corresponds to the dimension 312 of the scanning region 315.

In other examples, it would be possible to change both the amplitude of the torsion 871, 872 and also the amplitude of the curvature 811, 812 of the fiber 701. In still further examples, it would be possible to change only the amplitude of the torsion 871, 872 of the fiber 701. However, it would also be possible in principle to implement the superposition figures by way of orthogonal transverse modes of the fiber 701 and, for example, to change the amplitude of only one of the transverse modes.

The various branches of the superposition figure correspond to image lines of a LIDAR image, which is defined by the scanning region 315. By repeatedly reading out the detector, scanning points 351 or pixels can be obtained along the branches of the superposition figure. For successive LIDAR images, the superposition figure is repeatedly implemented at a specific repetition rate. The duration which is required to implement the superposition figure therefore corresponds to an image repetition rate.

Figure 21:
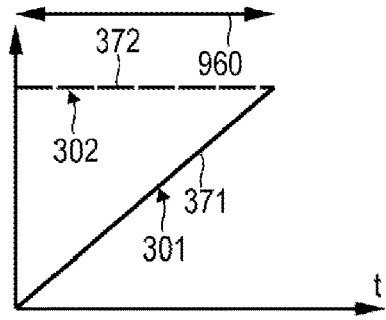
FIG. 21 schematically illustrates the change of the scanning amplitude during a scanning procedure for one degree of freedom of the movement of the fiber according to FIG. 15.

FIG. 21 illustrates aspects with respect to the scanning amplitudes 371, 372 of the movements 811, 812, 871, 872 of the fiber 701 according to the example of FIG. 20. In particular, FIG. 21 illustrates a time curve of the scanning amplitudes 371, 372.

The duration 960 which is required for scanning the superposition figure according to the example of FIG. 20 is shown in FIG. 21. The duration 960 can correspond, for example, to a repetition rate of the scanning procedure which is associated with the scanning region 315. For example—to reduce the image repetition rate (for example, to reduce the access to the spectrum of the laser light to avoid interference)—laser pulses could only be emitted for every second or third scanning of the superposition figure.

It is apparent from FIG. 21 that the scanning amplitude 371 of the movement, which corresponds to the scanning along the scanning axis 301, is increased monotonously and consistently during the duration 960. The amplitude 371 could also be increased step-by-step. The amplitude 371 could also be reduced monotonously.

In contrast, the scanning amplitude 372 of the movement which corresponds to the scanning along the scanning axis 302 remains constant during the duration 960. For example, a different scanning point density of the scanning points 351 could be achieved by a change of the rate of change of the scanning amplitude 371. For example, a less rapid increase of the scanning amplitude 371 could make it possible that the scanning lines of the superposition figure (cf. FIG. 20) are closer to one another and thus a greater scanning point density is achieved.

It is possible in this case, for example, that the rate of change of the scanning amplitude 371 has a dependence on the operating mode 81, 82. I.e., a flatter or steeper rise or drop of the scanning amplitude 371 could be implemented for different operating modes 81, 82. Then, for example, for smaller image ranges 315, a higher scanning point density could be achieved by a lower rate of change of the amplitude 371. For example, a high resolution can also be achieved for very remote objects in this manner at high speeds.

While the scanning amplitude 371 is varied along the scanning axis 301 in the example of FIG. 21, it would also be possible in other examples, alternatively or additionally to change the scanning amplitude 372 along the scanning axis 302. It is fundamentally possible to change or leave fixed the scanning amplitude with respect to transverse modes and/or torsion modes.

Of course, the features of the above-described embodiments and aspects of the invention can also be combined with one another. In particular, the features can be used not only in the described combinations, but rather also in other combinations or taken as such, without leaving the scope of the invention.

For example, various examples were described above with respect to different operating parameters. In this case, however, in further examples, still further operating parameters or other operating parameters can be taken into consideration. For example, it would be possible that a repetition rate 333-1, 333-2 of the pulses of the laser light 191 is spectrally formed—i.e., the laser pulses are not emitted at a single fixed frequency, but rather in a specific frequency band. For example, a random or quasi-random modulation of the repetition rate could be performed. Interference with other vehicles can thus be reduced. The width of the frequency band could then be adapted in dependence on the driving state. For example, a triangular probability density function $\rho$ could be defined with respect to the frequency band: this means that for each pulse, a specific repetition rate f0 occurs with the greatest probability, and repetition frequencies f having greater distances from the repetition rate f0 accordingly occur at lower probability. In general, $\rho$ can be a function of the distance to f0, i.e. $\rho(f)=f(|f_0-f|)$. It is thus possible that on average a specific repetition rate and thus a specific scanning point density is ensured. On the other hand, the interference with other vehicles can be reduced.

Various technologies were described above with respect to resonant operation of a laser scanner. These examples can also be used in conjunction with laser scanners which are operated in a non-resonant manner, however. For example, continuously rotating multifaceted mirrors or scanners operated step-by-step could be used. For example, galvanometer scanners could be used. Exemplary laser scanners are described, for example, in US 2017 0 131 387 A1.

Furthermore, various technologies were explained above with respect to a laser scanner. In some examples, however, it would not be necessary to use a laser scanner. Instead, for example, in general a position-resolved LIDAR system could be used.

Specifically, for example, flash-LIDAR technologies could also be used. A flash-LIDAR system is described, for example, in US 2012 0 038 903 A1. Instead of emitting light along a single direction, in flash-LIDAR, laser light is emitted simultaneously along a 1-D line or even in a 2-D region. In addition, for example, a widening element can be arranged in the beam path. The light reflected from different spatial regions is then imaged by means of a suitable optical unit on different pixels of a detector. For this purpose, light always has to be collected from the entire spatial region. A location space filtering by using the same detector aperture and emitter aperture—as possible, for example, in conjunction with scanning systems—is not used. The lateral location resolution can be achieved in flash-LIDAR by the association of spatial regions with different detector pixels. Such a flash-LIDAR system can also be operated using different operating modes. For example—as described above in conjunction with a scanner—the repetition rate at which laser light is emitted can be adapted (cf. FIG. 14). This can be desirable in particular, for example—as described above—if the access to the spectrum of the laser light is to be reduced by avoiding interference with other vehicles. This is because the interference with other vehicles can be particularly great in conjunction with flash-LIDAR systems: since the light per shot is emitted not only along a well-defined 0-D direction, but rather along a 1-D line or even in a 2-D region, and light has to be collected from a corresponding surrounding region, the susceptibility to interference can be particularly great in flash-LIDAR systems. Further parameters which can be varied from operating mode to operating mode in conjunction with flash-LIDAR systems comprise: image repetition rate, scanning point density (for example, by reducing the read-out pixels of the detector to reduce pixel crosstalk); dimensions and/or alignment of the acquisition region (for example, by varying the read-out pixels and/or by using different widening elements in the beam path).

The invention claimed is:

1. A device, comprising:
a laser scanner having a laser light source, wherein the laser scanner is configured to scan laser light from the laser light source along a first scanning axis;
wherein the laser scanner is configured to scan the laser light further along a second scanning axis, which is different from the first scanning axis,
wherein the laser scanner comprises at least one actuator, a first deflection unit, and a second deflection unit, which are configured for the laser light to pass through sequentially,
wherein the actuator is configured to effectuate a first movement of the first deflection unit according to the first scanning axis and a second movement of the second deflection unit according to the second scanning axis,
wherein the first movement and the second movement are overlaid with respect to time,
wherein the first deflection unit comprises a fiber and an optical element connected to a movable end of the fiber,
wherein the optical element comprises a mirror having a mirror surface and a rear side, and
wherein the fiber extends away from the rear side,
an interface, which is configured to receive control data, which are indicative of a driving state of a vehicle, and
at least one computer circuit, which is configured to operate the laser scanner in order to select an active operating mode from a plurality of operating modes in dependence on the driving state of the vehicle,
wherein the at least one computer circuit is further configured to carry out a measurement of distances to objects in the surroundings of the device based on the laser light.

2. The device as claimed in claim 1,
wherein the plurality of operating modes implement scanning regions having different dimensions and/or alignments along the first scanning axis.

3. The device as claimed in claim 2,
wherein the driving state of the vehicle comprises at least one of a yaw angle, a roll angle, and/or a pitch angle, wherein the computer circuit is configured to compensate for the yaw angle, the roll angle, and/or the pitch angle of the vehicle by means of the alignment of the scanning regions.

4. The device as claimed in claim 1,
wherein the plurality of operating modes implement scanning regions having different alignments along the first scanning axis,
wherein the different alignments of the scanning regions are defined by different arrangements of the center of the scanning regions,
wherein the laser scanner comprises at least one actuator, which is configured to effectuate the arrangements of the center of the scanning regions using a DC component of a driver signal.

5. The device as claimed in claim 1,
wherein the plurality of operating modes implement different pulse energies of pulses of the laser light and/or different repetition rates of the pulses of the laser light.

6. The device as claimed in claim 1,
wherein the plurality of operating modes implement different frequency bands for a repetition rate of pulses of the laser light.

7. The device as claimed in claim 1,
wherein the computer circuit operates the laser scanner in a first operating mode of the plurality of operating modes with an access to the laser light reduced in relation to an access to the laser light in a second operating mode of the plurality of operating modes,
wherein the first operating mode is associated with a driving state of the vehicle, which corresponds to inner-city traffic.

8. The device as claimed in claim 7, wherein the reduction of the access to the laser light comprises at least one of the following:
reducing a dimension of a scanning region;
reducing a scanning point density;
reducing an image repetition rate;
reducing a pulse energy of pulses of the laser light; and
reducing a repetition rate, with which the laser scanner emits pulses of the laser light.

9. The device as claimed in claim 1,
wherein the plurality of operating modes implement different scanning point densities along the first scanning axis.

10. The device as claimed in claim 9,
wherein, for a first operating mode of the plurality of operating modes, the scanning point density varies along the first scanning axis, and
wherein for a second operating mode of the plurality of operating modes, the scanning point density is constant along the first scanning axis.

11. The device as claimed in claim 1,
wherein the laser scanner comprises at least one actuator, which is configured to effectuate a first movement of a deflection unit of the laser scanner according to the first scanning axis using a change of a scanning amplitude during a scanning procedure which corresponds to a scanning region,
wherein the plurality of operating modes implement different rates of change of the scanning amplitude of the first movement.

12. The device as claimed in claim 1,
wherein the first scanning axis is aligned vertically in relation to the vehicle.

13. The device as claimed in claim 1, wherein the driving state is selected from the following group:

a road type, comprising one of a freeway, inner-city street, country road, or state highway;
a speed of the vehicle;
a yaw angle of the vehicle;
a roll angle of the vehicle;
a pitch angle of the vehicle;
a height profile of a road;
an inclination level of the road; and/or a weather situation, comprising one of rain, snow, night, sunshine, dryness, ambient humidity, or ambient brightness.

14. The device as claimed in claim 1,
wherein the at least one actuator is configured to effectuate the first movement and/or the second movement using an AC component of a driver signal.

15. A method, comprising:
emitting laser light using a laser scanner along a first scanning axis,
receiving control data, which are indicative of a driving state of a vehicle,
activating the laser scanner to select an active operating mode from a plurality of operating modes in dependence on the driving state of the vehicle, and
carrying out a measurement of distances to objects in a surrounding area of the vehicle based on the laser light,
wherein the method is executed by a device, the device comprising:
a laser scanner comprising a laser light source, wherein the laser scanner is configured to scan laser light from the laser light source along a first scanning axis,
wherein the laser scanner is configured to scan the laser light further along a second scanning axis, which is different from the first scanning axis,
wherein the laser scanner comprises at least one actuator, a first deflection unit, and a second deflection unit, which are configured for the laser light to pass through sequentially,
wherein the actuator is configured to effectuate a first movement of the first deflection unit according to the first scanning axis and a second movement of the second deflection unit according to the second scanning axis,
wherein the first movement and the second movement are overlaid with respect to time,
wherein the first deflection unit comprises a fiber and an optical element connected to a movable end of the fiber,
wherein the optical element comprises a mirror having a mirror surface and a rear side, and
wherein the fiber extends away from the rear side,
an interface, which is configured to receive control data, which are indicative of a driving state of a vehicle, and
at least one computer circuit, which is configured to operate the laser scanner in order to select an active operating mode from a plurality of operating modes in dependence on the driving state of the vehicle,
wherein the at least one computer circuit is further configured to carry out a measurement of distances to objects in the surroundings of the device based on the laser light.

16. A device comprising:
a LIDAR system comprising a laser scanner having a laser light source, wherein the LIDAR system is configured to monitor reflections of laser light from the laser light source along a first axis in a position-resolved manner,
wherein the laser scanner is configured to scan laser light from the laser light source along a first scanning axis,
wherein the laser scanner is configured to scan the laser light further along a second scanning axis, which is different from the first scanning axis,
wherein the laser scanner comprises at least one actuator, a first deflection unit, and a second deflection unit, which are configured for the laser light to pass through sequentially,
wherein the actuator is configured to effectuate a first movement of the first deflection unit according to the first scanning axis and a second movement of the second deflection unit according to the second scanning axis,
wherein the first movement and the second movement are overlaid with respect to time,
wherein the first deflection unit comprises a fiber and an optical element connected to a movable end of the fiber,
wherein the optical element comprises a mirror having a mirror surface and a rear side, and
wherein the fiber extends away from the rear side,
an interface, which is configured to receive control data, which are indicative of a driving state of a vehicle, and
at least one computer circuit, which is configured to operate the LIDAR system to select an active operating mode from a plurality of operating modes in dependence on the driving state of the vehicle,
wherein the at least one computer circuit is further configured to carry out a measurement of distances to objects in the surroundings of the device based on the laser light.

17. The device as claimed in claim 16, wherein the LIDAR system comprises a flash-LIDAR system.

* * * * *